US010751941B2

(12) United States Patent
Chanclon Fernandez et al.

(10) Patent No.: US 10,751,941 B2
(45) Date of Patent: Aug. 25, 2020

(54) BUILD MATERIAL CONTAINER

(71) Applicant: HEWLETT-PACKARD DEVELOPMENT COMPANY, L.P., Houston, TX (US)

(72) Inventors: Ismael Chanclon Fernandez, Sant Cugat del Valles (ES); Xavier Alonso Becerro, Sant Cugat del Valles (ES); Ernesto Alejandro Jones Poppescou, Vacarisses (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/094,426

(22) PCT Filed: May 12, 2016

(86) PCT No.: PCT/EP2016/060748
§ 371 (c)(1),
(2) Date: Oct. 17, 2018

(87) PCT Pub. No.: WO2017/194135
PCT Pub. Date: Nov. 16, 2017

(65) Prior Publication Data
US 2019/0126546 A1    May 2, 2019

(51) Int. Cl.
*B29C 64/255* (2017.01)
*B33Y 40/00* (2020.01)
(Continued)

(52) U.S. Cl.
CPC ............ *B29C 64/255* (2017.08); *B29C 31/02* (2013.01); *B29C 64/20* (2017.08); *B33Y 40/00* (2014.12); *B29C 64/153* (2017.08)

(58) Field of Classification Search
CPC ..... B29C 64/255; B29C 64/20; B29C 64/153; B29C 31/02; B33Y 40/00
See application file for complete search history.

(56) References Cited

U.S. PATENT DOCUMENTS 2,981,444 A * 4/1961 Root .................. B05B 11/045
                                                222/632
3,240,399 A * 3/1966 Frandeen ............ B05B 11/047
                                                222/211
(Continued)

FOREIGN PATENT DOCUMENTS

CN        2918329 Y    7/2007
CN      201949844 U    8/2011
(Continued)

OTHER PUBLICATIONS

International Search Report and Written Opinion for International Publication No. PCT/EP2016/060748 dated Feb. 21, 2017, 10 pages.
(Continued)

*Primary Examiner* — Frederick C Nicolas
(74) *Attorney, Agent, or Firm* — HP Inc. Patent Department

(57) ABSTRACT

An additive-manufacturing build-material container (201) comprises a reservoir to hold build material, an outlet opening in a top portion of the reservoir, an outlet tube structure including a longitudinal collection unit to collect build material from the bottom and guide the build material to the outlet opening at the top, upon application of a suction force at the other end thereof, and to guide the collected build material to the outlet opening at the top; and a vent opening in a top portion of the reservoir to admit gas from outside the reservoir into the reservoir to follow a gas flow path through the vent opening, through the reservoir and into the one end of the longitudinal collection tube; wherein on the gas flow path there is at least one turbulent gas-flow-generation feature (237) to generate turbulent gas flow in a region that is within the reservoir and outside the longitudinal collection tube.

16 Claims, 11 Drawing Sheets

(51) Int. Cl.
   *B29C 64/20* (2017.01)
   *B29C 31/02* (2006.01)
   *B29C 64/153* (2017.01)

(56) References Cited

U.S. PATENT DOCUMENTS

| | | | | |
|---|---|---|---|---|
| 3,371,822 A * | 3/1968 | Galloway | ............. | A23G 9/045 |
| | | | | 222/95 |
| 3,471,064 A * | 10/1969 | Micallef | ................ | B65D 83/14 |
| | | | | 222/211 |
| 4,159,790 A * | 7/1979 | Bailey | ..................... | B05B 15/30 |
| | | | | 222/211 |
| 4,311,492 A * | 1/1982 | Eltvedt | .................. | B65D 51/00 |
| | | | | 210/406 |
| 5,275,313 A * | 1/1994 | Petrillo | ................ | B67D 7/0288 |
| | | | | 222/377 |
| 5,505,223 A | 4/1996 | Rings et al. | | |
| 6,264,058 B1 * | 7/2001 | Porter | ................ | A47G 19/2266 |
| | | | | 220/703 |
| 6,810,929 B1 * | 11/2004 | Tansey | .................... | B05B 7/144 |
| | | | | 141/231 |
| 7,048,156 B2 * | 5/2006 | Weck | ................. | B05B 11/0037 |
| | | | | 222/382 |
| 7,097,072 B2 * | 8/2006 | Tan | ..................... | B67D 1/0009 |
| | | | | 222/189.06 |
| 7,296,590 B2 * | 11/2007 | Kitagawa | .............. | B01L 3/0293 |
| | | | | 137/398 |
| 7,311,474 B1 | 12/2007 | Ogasahara et al. | | |
| 7,971,991 B2 | 7/2011 | Davidson et al. | | |
| 8,844,776 B2 * | 9/2014 | Haas | .................... | B67D 7/0294 |
| | | | | 222/1 |
| 8,931,650 B2 * | 1/2015 | McKendry | ................ | A61J 9/04 |
| | | | | 210/223 |
| 2004/0035881 A1 * | 2/2004 | Hammarth | ............ | B05B 1/3046 |
| | | | | 222/105 |
| 2008/0187423 A1 | 8/2008 | Mauchle et al. | | |
| 2019/0061251 A1 * | 2/2019 | Chanclon | ............. | B22F 3/1055 |
| 2019/0061252 A1 * | 2/2019 | Nicolau | ................. | B22F 3/1055 |
| 2019/0118470 A1 * | 4/2019 | Alonso | ................. | B33Y 30/00 |
| 2019/0126545 A1 * | 5/2019 | Chanclon | ............. | B22F 3/1055 |

FOREIGN PATENT DOCUMENTS

| | | |
|---|---|---|
| DE | 2659058 | 7/1978 |
| EP | 2604909 | 6/2013 |
| JP | H06218305 | 8/1994 |
| JP | 2009538226 | 11/2009 |
| KR | 10-1436647 | 9/2014 |

OTHER PUBLICATIONS

Z® 810 Color 3D Printer User Manual, Sep. 2004, Noble3DPrinters, 164 pages https://www.noble3dprinters.com/wp-content/uploads/2014/07/Z810T3-User-Manual-Rev-B.pdf.

* cited by examiner

Fig. 9A
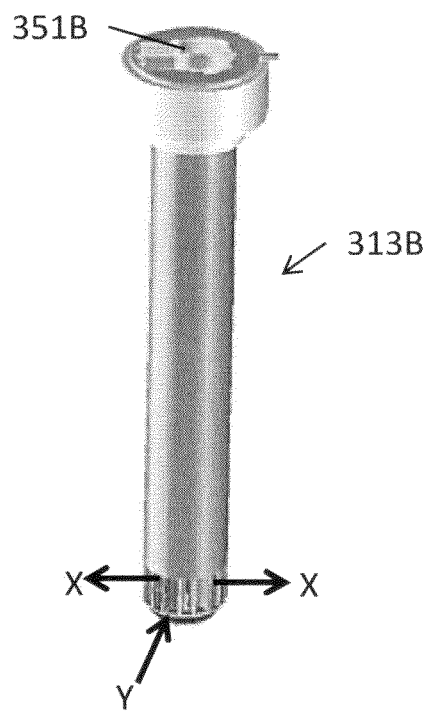
Fig. 9B
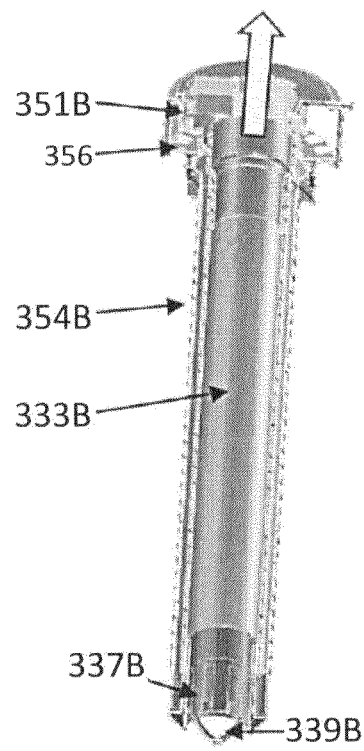
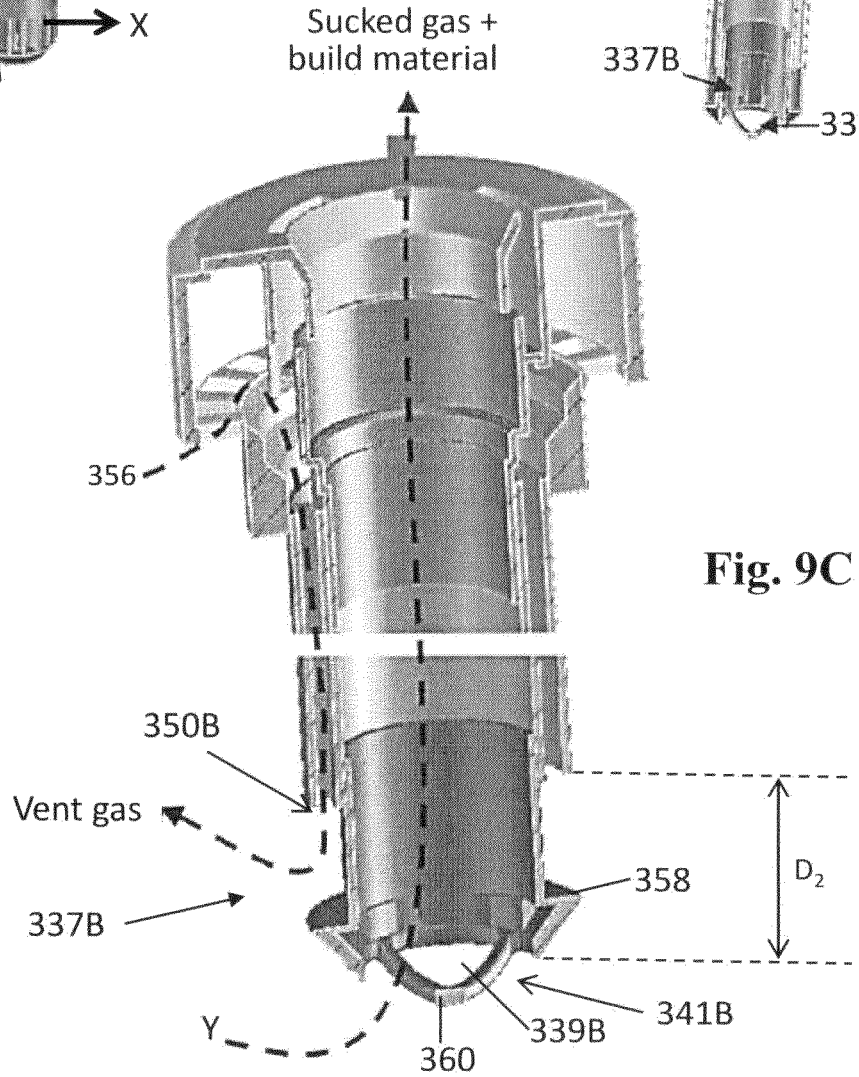
Fig. 9C

BUILD MATERIAL CONTAINER

BACKGROUND

Additive manufacturing techniques such as three-dimensional (3D) printing, relate to techniques for making 3D objects of almost any shape from a digital 3D model through additive processes, in which 3D objects are generated on a layer-by-layer basis under computer control. A large variety of additive manufacturing technologies have been developed, differing in build materials, deposition techniques and processes by which the 3D object is formed from the build material. Such techniques may range from applying ultraviolet light to photopolymer resin, to melting semi-crystalline thermoplastic materials in powder form, to electron-beam melting of metal powders.

Additive manufacturing processes usually begin with a digital representation of a 3D object to be manufactured. This digital representation is virtually sliced into layers by computer software or may be provided in pre-sliced format. Each layer represents a cross-section of the desired object, and is sent to an additive manufacturing apparatus, that in some instances is known as a 3D printer, where it is built upon a previously built layer. This process is repeated until the object is completed, thereby building the object layer-by-layer. While some available technologies directly print material, others use a recoating process to form additional layers that can then be selectively solidified in order to create the new cross-section of the object.

The build material from which the object is manufactured may vary depending on the manufacturing technique and may comprise powder material, paste material, slurry material or liquid material. The build material is usually provided in a source container from where the build material needs to be transferred to the building area or building compartment of the additive manufacturing apparatus where the actual manufacturing takes place.

DRAWINGS

FIG. 9A illustrates, in perspective view, a diagram of another example of a collection tube structure;

FIG. 9B illustrates a vertical cross-section through the collection tube structure of FIG. 9A;

FIG. 9C is an enlarged cross-sectional view of the top and bottom portions of the collection tube structure of FIGS. 9A and 9B;

DESCRIPTION

Figure 1:
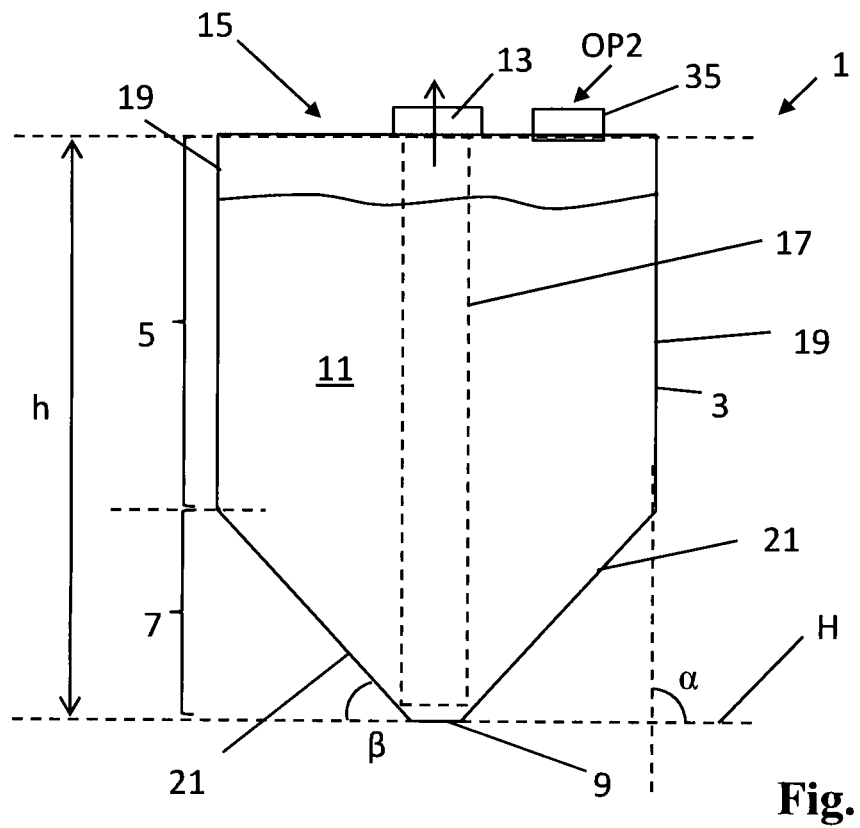
FIG. 1 illustrates a diagram of an example of a container of build material.

Three-dimensional objects can be generated using additive manufacturing techniques. The objects may be generated by solidifying portions of successive layers of build material. The build material can be powder-based and the material properties of generated objects may be dependent on the type of build material and the type of solidification. In some examples, solidification of the powder material is enabled using a liquid fusing agent. Solidification may be further enabled by temporary application of energy to the build material. In certain examples, fuse and/or bind agents are applied to build material, wherein a fuse agent is a material that, when a suitable amount of energy is applied to a combination of build material and fuse agent, causes the build material to fuse and solidify. In other examples, other build materials and other methods of solidification may be used. In certain examples, the build material includes paste material, slurry material or liquid material. This disclosure describes examples of build material containers for adding build material to the additive manufacturing process.

In one example the build material in the container of this disclosure is powder that has an average volume-based cross sectional particle diameter size of between approximately 5 and approximately 400 microns, between approximately 10 and approximately 200 microns approximately, between approximately 15 and approximately 120 microns or between approximately 20 and approximately 70 microns. Other examples of suitable, average volume-based particle diameter ranges include approximately 5 to approximately 70, or approximately 5 to approximately 35 microns. In this disclosure a volume-based particle size is the size of a sphere that has the same volume as the powder particle. With "average" it is intended to explain that most of the volume-based particle sizes in the container are of the mentioned size or size range but that the container may also contain relatively small amounts of particles of diameters outside of the mentioned range (e.g., less than 5%, or less than 2%, or less than 1%, or less than 0.1%). For example, the particle sizes may be chosen to facilitate distributing build material layers having thicknesses of between approximately 10 and approximately 500 microns, or between approximately 10 and approximately 200 microns, or between approximately 15 and approximately 150 microns. One example of an additive manufacturing apparatus may be pre-set to distribute build material layers of approximately 80 microns using build material containers that contain powder having average volume-based particle diameters of between approximately 40 and approximately 60 micron. For example the additive manufacturing apparatus can be reset to distribute different layer thicknesses.

Suitable powder-based build materials for additive manufacturing include polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, multi-color powder, and plastics/ceramics blends. There exist more build materials and blends of build materials that can be contained by a container of this disclosure and that are not mentioned in this disclosure.

A particular batch of build material used in an additive manufacturing process may be "virgin" build material or "used" build material (e.g. recycled build material recovered at the end of a manufacturing process in which it did not get incorporated into the manufactured item). The present disclosure relates to containers for build material irrespective of the status (virgin, used, recycled) of the batch of material.

In one example, fusing agent is dispensed onto build material by a printhead of a 3D printer. A 3D printer is one type of an additive manufacturing apparatus. In this particular disclosure an additive manufacturing apparatus may also be a build material recycler that is not necessarily a part of the 3D printer. An example of an additive manufacturing component is a build material stage for additive manufacturing that is used to distribute build material onto, to receive the fuse agent and support the object during additive manufacturing. The build material stage can be a separately moveable component to be connected to an additive manufacturing apparatus such as the 3D printer or recycler. The additive manufacturing apparatus or component may include a build material collection system to collect build material from a build material container. The build material collection system may also be a separate sub-system, separate from any additive manufacturing apparatus.

The build material container may be a source container from which build material is added to the additive manufacturing process. The source container can contain fresh or used (recycled) build material.

FIG. 1 illustrates a diagrammatic front view of an example of a container 1 for supplying build material 11 to an additive manufacturing process. In one example, a container 1 is a replaceable source container 1 that is to be connected to a collection system of an additive manufacturing apparatus or a separate build material collection system. Thereby, the collection system can collect most or all of the build material from the container 1 and provide it to a respective additive manufacturing apparatus. The container 1 can be disconnected from the additive manufacturing apparatus after exhaustion, to be replaced by another, similar container with build material.

Some example containers of this disclosure may promote automation of an additive manufacturing process by comprising features that facilitate automatic emptying of the containers, substantially without additional human intervention, while the containers are connected to the collection system. Thus, for instance, such example containers may discharge build material to attain an acceptable degree of container emptiness without human intervention to agitate the container, or to displace a nozzle that sucks up build material, and so forth.

Some example containers of this disclosure may be to facilitate efficient removal of build material contained within those containers. Some such example containers may, e.g., comprise features to ensure that most or all of the build material can be removed from a container. Some example containers of this disclosure may comprise features that cause, contribute to or promote chaotic or turbulent air flow in a reservoir, of the container, from which build material is being removed by aspiration. Turbulent air flow within the reservoir may facilitate efficient collection-by-suction of build material contained within those containers. Turbulent air flow may suspend particles of build material in air (or other gas, see below), facilitating aspiration of the suspended particles by a collection unit. Some example containers may comprise features that cause, contribute to or promote turbulent air flow within the reservoir at least in a region outside a suction end of a collection tube of the collection unit, for example in a zone surrounding the suction end of the collection tube. Some example containers may comprise features that promote generation or distribution of turbulent air flow substantially throughout the whole volume of the reservoir.

Some example containers may comprise features that cause, contribute to or promote evenness in the distribution of turbulent air flow within the reservoir, to enhance efficiency of removal of build material. Turbulent air flow may help to remove air pockets and break up bridges and other structures made of compacted build material that tend to inhibit extraction of the build material from the reservoir. Turbulent air flow may help to dislodge build material from the reservoir walls. Turbulent air flow may facilitate movement of the reservoir walls (vibration, flexure, bending) which in turn may help to dislodge build material form the walls and/or impel build material towards the collection zone.

Some example containers may comprise features to ensure that the containers can be easily stacked, stored, transported, disposed or refilled. In a filled condition, the container should contain a relatively large volume of build material.

The container 1 is illustrated in an upright orientation. In one example the build material is powder, for example of a type and/or particle size as described above. The container 1 includes a reservoir 3 for holding the build material 11. The build material is contained by walls of the reservoir 3. The container 1 further includes an outlet structure 13 including an opening to allow build material to pass out of the reservoir 3, or where needed, into the reservoir 3. In the example illustrated in FIG. 1 the outlet structure 13 is provided in or near a top side 15 of the container 1. The outlet structure 13 is adapted to cooperate with a corresponding collection system that is to collect build material from the container 1. In a first usage of the container 1, the container 1 may contain virgin build material.

The container of this example further includes a second opening OP2 defined by a structure 35 (which may be a throughput structure as described below with reference to FIG. 3A). This second opening OP2 may act as a vent allowing vent gas into the reservoir.

The reservoir 3 also includes a funneled, lower portion 7 (that may be called "funnel" hereafter) having at least one converging side wall 21. The reservoir 3 includes an upper portion 5 of at least one non-converging side wall 19, above the funnel 7. In one example, the upper and lower portion 5, 7 are part of a single, monolithic, reservoir. The non-converging side walls extend upwards from the funnel 7, along most of the height h of the reservoir 3 (considering the reservoir 3 in an upright, unfolded and filled condition). The at least one non-converging side wall 19 of the upper portion 5 may extend substantially upright, i.e. vertically, in an upright, unfolded and filled condition of the container 1. In different examples, the at least one non-converging side wall 19 may be at least one rounded wall, or four walls that form a square or rectangle with straight or rounded corners, or any other desired combination of walls. In this example we will discuss a rectangular version having four non-converging side walls 19.

In an example, the non-converging side walls 19 vary from vertical, in said upright orientation of the container 1, for example because of manufacturing tolerances, mold release angles, thermal curing of the reservoir, or other reasons. For example the non-converging side walls 19 may have an angle α of between approximately 85 and 95 degrees from a horizontal H, or of a slightly bulging undulated (outwards or inwards) shape. In one example, the angle α with respect to the horizontal H of the relatively non-converging side walls 19 should be closer to a right angle than is the angle β of the converging side walls 21 of the funnel 7 with respect to the horizontal H.

In one example an approximate angle β with the horizontal of the converging side walls 21 of the funnel 7 can be between approximately 10 and approximately 70 degrees, or between 20 and approximately 60 degrees. The non-converging side walls 19 could converge somewhat but not as much as the converging walls 21 of the funneled portion, that converge to the bottom 9. In one example a width of the container 1 at the top of the funnel 7 or bottom of the upper portion 5, is approximately the same as a width of the container 1 at the top of the upper portion 5. The non-converging upper portion 5 may allow for efficient build material storage while the funnel 7 may allow for efficient build material retrieval.

Figure 2:
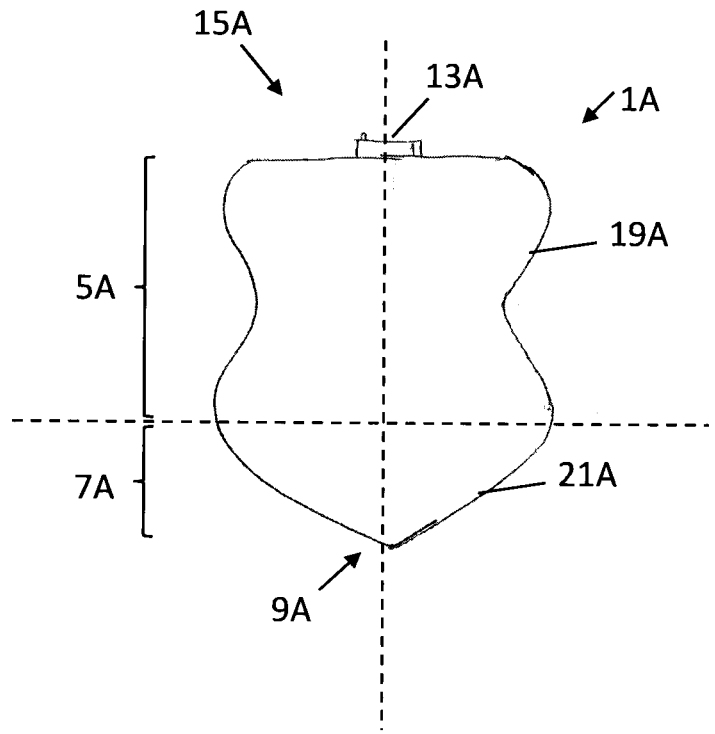
FIG. 2 illustrates a diagram of another example of a container of build material.

FIG. 2 illustrates an example container 1A of this disclosure where walls 19A of the upper portion 5A have an undulated shape, while a bottom portion 7A converges to a bottom 9A. The upper portion 5A may locally show some convergence because of the undulated shape but a width of the container 1A at the top of the funnel 7A or bottom of the upper portion 5A, is approximately the same as a width of the container 1A at the top 15A of the upper portion 5A. The funnel 7A clearly has converging side walls 21A up to the bottom. Hence we refer to the upper portion as a relatively non-converging portion 5A with relatively non-converging side walls 19A, as compared to the funnel 7A.

Back to the example of FIG. 1, the lower portion 7 of the reservoir 3 may function as a funnel and includes at least one converging side wall 21. The funnel 7 may have a truncated and/or rounded bottom 9 onto which the converging walls 21 terminate. The bottom 9 onto which the converging walls 21 terminate may be a point, a line, an oval, a rectangle, or it may have another desired shape. In different examples, the funnel 7 may include one round side wall, or may have a rectangular cross-section of four converging side walls 21 with pointy or rounded borders in between, or may have any other desired combination of walls. Here we will discuss an upside-down-pyramid-shaped funnel 7 of four converging side walls 21. In one example the pyramidal funnel 7 may allow for more build material storage than a conical (round) funnel 7 of the same diameter.

The inclination β of the funneled walls 21 can be chosen so that build material drops or slides towards the bottom 9, thereby facilitating that build material can be collected from the bottom 9. For example the inclination β of the funneled walls with respect to a horizontal H can be between approximately 60 and approximately 20 degrees. In one example, the converging walls 21 of the funnel 7 are relatively straight. In other examples the funnel walls 21 can also be at least partially rounded and/or include different inclinations with respect to the horizontal H, for example at least partly within said range. The converging walls 21 may at least partly flex in a partly empty or an operational condition of the reservoir 3; the walls 21 may include wrinkles, curvatures, ridges, undulated shapes, etc., before, during or after pressure has been applied to the inside of the reservoir 3. The converging walls 21 may guide the build material 11 towards the bottom 9 from where the build material 11 can be readily collected for delivery to a respective additive manufacturing apparatus, thereby facilitating collection of most or all of the build material from the reservoir 3.

The reservoir 3 may be made of at least partly flexible material. For example, the reservoir 3 can be folded in an empty condition, the walls may flex in a partly empty or an operational condition of the reservoir 3, the walls 19, 21 may include wrinkles, curvatures, ridges, undulated shapes, etc. For example, upright walls of the upper portion 5 have a default substantially upright orientation in an unfolded, filled condition of the container 1. In another example, the reservoir 3 may be relatively rigid, or partly relatively rigid and partly relatively flexible.

In one example relatively flexible can be understood as allowing bending of the wall material, while a rigid material should be understood as resisting bending or stretching. A flexible material or compound can be elastic (e.g. PE or other polymer based materials) or non-elastic (e.g. Mylar or other materials including film layers that include a vapor barrier layer). In one example, a flexible and elastic wall material used in the reservoir has a Young's modulus of less than approximately $1*10^9$ N/m² GPa, or less than approximately $0.3*10^9$ N/m² GPa. In one example a relatively rigid or non-elastic wall material used in the reservoir has a Young's modulus of more than approximately $1*10^9$ N/m² GPa.

FIG. 1 illustrates an instance of certain example containers according to the present disclosure in which the build material 11 is to be collected from the bottom 9 with the aid of a collection unit 17. Various embodiments of the collection unit 17 may be implemented in the present disclosure. In the example illustrated in FIG. 1 the collection unit 17 extends from a top opening of the top outlet structure 13 to the bottom 9. As an example, the collection unit 17 can be a tube to suck in build material from the bottom 9 by applying a vacuum to the tube through an external pressure unit. The external pressure unit may generate a negative pressure to the reservoir to suck up build material, or may be configured to generate a negative and positive pressure, depending if it is switched to a fill or suction mode.

The collection unit 17 can be part of, or connectable to, an external build material collection system. In one example, the collection unit 17 is integrated with the outlet structure 13 of the container 1 whereby the build material is collected from the bottom 9 with the aid of an external collection system that connects to the collection unit 17 through the outlet structure 13. For example, the collection unit 17 is a tube and the external collection system includes a pressure unit, whereby build material is sucked into the collection unit 17 by the pressure unit. The collection tube 17 may be integrated with the outlet structure 13 by forming the collection unit 17 and outlet structure 13 as a monolithic structure or by forming the collection unit 17 and outlet structure 13 separately and connecting them together (removably, if desired).

In the examples illustrated in FIGS. 1 and 2, the upper, non-converging portion 5, 5A of the reservoir 3, 3A covers most of the height h of the reservoir 3, 3A as measured between the bottom 9, 9A and the top 15. For example, the upper portion 5, 5A covers at least 50%, at least 60%, at least 70%, at least 80%, or at least 90% of the height h of the reservoir 3, 3A, as measured between the bottom 9, 9A and the top wall 15, 15A. The upper portion 5, 5A facilitates storing a relatively high volume of build material within a given width or diameter of the container 1, 1A. Only a smaller, lower portion of the reservoir 3, 3A is funneled. In one example, between 5% and 40%, between 5% and 30%, between 5% and 20%, or between 5% and 10% of the reservoir 3, 3A forms the funneled bottom portion 7. Hence, where the container 1, 1A is a replaceable supply of virgin powder, many filled containers 1, 1A can be vertically and horizontally stacked for transport, whereby a relatively high amount of the total space consumed by the stacked containers 1, 1A is occupied by build material. At the same time, the funnel 7, 7A facilitates readily emptying these containers 1, 1A, e.g. during additive manufacturing, by channeling the build material to the bottom 9, 9A for collection. The container 1, 1A may serve as a replaceable supply, to be replaced after emptying.

In different examples the build material reservoirs 3 are to hold build material volumes of for example approximately 5 to approximately 50 liters, approximately 10 to approximately 40 liters, for example approximately 30 liters. The weights associated with these volumes may depend on the build material, powder grain size, etc. Example containers 1 to hold these volumes may be of a height of approximately 700 mm or less, approximately 650 millimeters or less, for example having a width of approximately 400 mm or less. These dimensions, and associated weights, may allow for readily handling the container 1 by an operator, for example to manually lift, stack and move the container 1. Also, the container 1 may be adapted to be folded, stacked and/or disposed of in an empty condition.

In certain examples, the container 1 can have larger build material volumes such as for example more than said 50 liters, for example up to 100, 150 or 200 liters.

The container 1, 1A may comprise features to cause, promote or contribute to turbulent air flow, and/or to promote even distribution of turbulent air flow, within the reservoir during collection of build material from the reservoir via the collection unit 17. For instance, such features may include (but are not limited to) the shape of the reservoir, the cross-sectional area of the collection tube, the position of the suction end of the collection unit 17 relative to the shape of the reservoir, and the air flow (e.g. flow rate, flow speed) generated at the suction end of the collection tube 17 during collection of build material from the bottom portion of the reservoir. Structural features to promote turbulent air flow may be provided on the collection tube 17, for example using a hollow end cap, baffles in the air flow path, and so forth as described below in relation to further example containers.

Figure 3A:
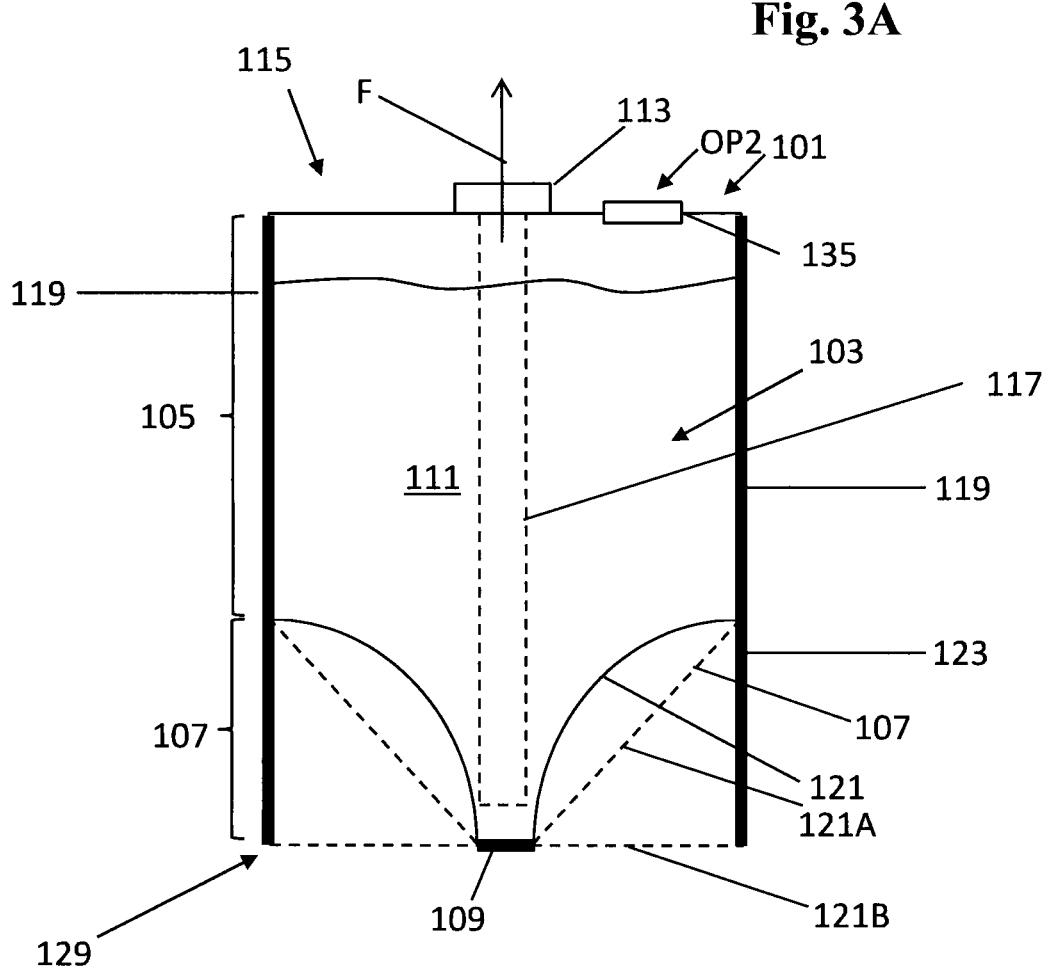
FIG. 3A illustrates a diagram of another example of a container of build material.

FIG. 3A illustrates an additive-manufacturing build material container 101 (e.g. a container of build material for 3D printing) that includes an at least partly flexible reservoir 103 and a reinforcement structure 123 to support at least parts of the reservoir 103. An outlet structure 113 having a first opening is provided in a top wall 115 of the reservoir 103 to allow build material to exit the reservoir 103, or where needed, to pass into the reservoir 3. A throughput structure 135 that includes a second opening OP2 through the reservoir 103 is provided in the top wall 115 and may function as a vent. The second opening OP2 also provides access to build material 111 in and out of said reservoir 103. The second opening OP2 may be used for venting of the inside of the reservoir 103 as well as for emptying and/or filling of the build material container 101 when needed. In the example depicted in FIG. 1, the throughput structure 135 that includes the second opening OP2 is provided in the top wall 15 of the container 1, although other arrangements are possible.

The second opening OP2 may have any appropriate shape. The second opening may be circular in shape. A circular shape may facilitate easy filling and emptying of the container via the throughput structure. The size of the second opening OP2 may be set in view of providing access to build material 111 in and out of the reservoir 103. The size of the second opening OP2 may be set in view of promoting a particular degree of turbulence in the reservoir. As the cross-sectional area of the second opening increases, the gas flow through the opening may increase and this may promote onset of turbulence and/or increase the degree of turbulence. In certain cases the size of the second opening OP2 may be adjusted in view of filter material provided in the throughput structure and/or the pressure drop in the reservoir.

In a particular example, the second opening is circular and the diameter of the second opening OP2 is greater than 30 mm, for instance between approximately 50 and 65 mm, to allow proper filling and emptying while ensuring a desired air flow, for instance between 20 and 30 liters/second, during part of the build-material collection process. Although a diameter range of 50 to 65 mm may be optimal for a reservoir 103 of between approximately 20 and 40 liters for instance (e.g., approximately 30 L), the second opening's diameter may be adapted depending on the volume of the reservoir 103.

The outlet opening and second opening OP2 may be defined by structural elements that are fitted to holes in the reservoir (as, for instance, in the example container described below with reference to FIG. 11). The holes in the reservoir where the structure defining the outlet opening and the structure defining the second opening OP2 are provided may have approximately the same diameter. When the outlet structure and throughput/vent structure are mounted on the reservoir they may define an outlet opening and second opening OP2 having different diameters. For example, the inner diameter of the second opening OP2 may be 100-200% the inner diameter of an end of the collection tube defining the outlet opening, or may be 120-170% the inner diameter of an end of the collection tube defining the outlet opening. An example of a possible pair of values is 58 mm for the diameter of the vent opening and 38 mm for the inner diameter of the collection tube.

In the illustrated example, the reservoir 103 includes at least one wall 121 of a relatively flexible material that may at least partly bend and/or stretch under pressure. For example, the reservoir 103 is at least partly flexible to facilitate collapsing for transport, storage or disposal in an empty condition, and/or to facilitate flow of build material.

The reinforcement structure 123 is to reinforce the at least partly flexible reservoir. Walls of the reinforcement structure 123 are more rigid than walls of the flexible material. The reinforcement walls are to resist flexing or bending. The reinforcement structure 123 may include walls 125 that extend from a top 115 up to a bottom 109 of the container 101. The reinforcement structure 123 may include different sections or holes. The reinforcement structure 123 may generally be of a single material. The reinforcement structure 123 may form a base 129 or at least one foot of the container 101. In one example the reinforcement structure 123 is to retain certain wall portions of the reservoir 103 in a predetermined shape during filled container transport and/or build material retrieval. For example, the reservoir 103 may include an at least partly flexible bag such as a bag made of plastics or multi-layer vapor barrier material, and the reinforcement structure 123 may include foldable material such as cardboard, metal or relatively rigid materials.

In one example, all four non-converging side walls 119 and four converging bottom walls 121 of the reservoir 103 are flexible. The reinforcement structure 103 extends on the outside and along the outer edge of the reservoir 103. Portions of the flexible reservoir walls 119, 121 are adhered to the outer reinforcement structure 123. Thereby the reinforcement structure 123 supports the flexible reservoir 103. In an example, the reservoir 103 includes, or is formed of, a flexible plastic bag and the reinforcement structure 123 includes, or is formed of, cardboard.

In one mode of operation, a vacuum F is applied to the reservoir 103 by connecting a vacuum system to the outlet structure 113. Thereby, build material is sucked out of the reservoir 103, through the outlet structure 113. Because of the vacuum applied to the reservoir 103 at least partly flexible lower walls 121 of the lower portion 107 may bulge inwards (as illustrated by inwards bending lower walls 121) as a result of said vacuum F.

However, in a non-operational, filled state of the reservoir 103, the lower walls 121A or 121B may have a default straight shape. In one example, the lower portion 107 may include inclined, converging walls 121A to form a funneled bottom. In another example the walls may form a relatively flat bottom 121B that bulge inwards under vacuum pressure as illustrated by lines 121.

Any flexible wall material of the reservoir 103 that is not attached to the reinforcement structure 123 can change shape when a vacuum is applied. For example the flexible walls may vibrate, bend, flex, stretch, wrinkle, etc. when the vacuum is applied to the outlet structure 113. Build material within the container may compact over time and it may form bridge structures, trapped air pockets and the like which may impede free movement of the build material when removal of the build material from the container is desired. Also, static electricity may make the build material cling to the walls of the reservoir. The wall movements and deformations may aid in moving the build material towards a collection area at the bottom 109. The wall movements may aid in stirring, mixing and/or retrieving the build material. The illustrated example container 101 further includes a longitudinal collection unit 117 that extends from the outlet structure 113 at the top 115 to near the bottom 109, to collect the build material 111 from the collection area near the bottom 109 and guide it out of the reservoir 103 through the outlet structure 113.

The reinforcement structure 123 may strategically reinforce certain portions of the reservoir 103 while allowing flexible portions to flex and move. The reinforcement structure 123 may inhibit that the flexible wall material could isolate build material from the collection area, for example in pockets in the flexible wall. In one example container 101A, illustrated in horizontal section in FIG. 3B, the reinforcement structure 123A reinforces two opposite non-converging side walls 119a, 119b of the reservoir 103A, while allowing two other, non-attached non-converging side walls 119c, 119d to move, e.g. to bend inwards. In one example, the reinforcement structure 123 reinforces at least portions of all four converging bottom walls 121. In another example, the reinforcement structure 123 reinforces two opposite converging bottom walls 121, while allowing another two opposite converging walls 121 to move, e.g. to bend inwards. In yet another example container 101B, illustrated in vertical section in FIG. 3C, a reservoir 103B formed of a flexible bag is reinforced by a barrel-shaped reinforcement structure 123B and the reservoir 103B Is attached to the reinforcement structure 123B at continuous or discrete points P located around the top of the barrel shape, around the boundary between the upper and lower portions 105B, 107B and at the bottom 109B. Portions of the reservoir walls that are not attached to the reinforcement structure 123B may move, for example under the effect of air flow and/or pressure in the reservoir.

Flexible reservoir walls 119, 121 can be relatively elastic or relatively non-elastic. An example of a relatively elastic reservoir wall can be made of polyethylene or thin-walled PET. An example of a non-elastic flexible reservoir wall material includes a metal film layer. An example elastic reservoir wall material can have a Young's modulus of less than approximately $1*10^9$ N/m$^2$ GPa, or less than approximately $0.3*10^9$ N/m$^2$ GPa. A reinforcement wall material can have a Young's modulus of more than approximately $1*10^9$ N/m$^2$ GPa.

The reservoir walls 119, 121, 109, 115 may form a vapor and/or gas barrier, having a relatively low gas/vapor permeability, for example to inhibit degradation of the build material. In an example of a flexible reservoir, the wall material may include a metallized barrier film or polymer barrier material, for example mylar, polyethylene (PE), thin PET, respectively. In one example, a plastic barrier material such as PE is used because of its elastic properties.

Certain features of the container 101, 101A, 101B may cause, promote or contribute to turbulent air flow within the reservoir during collection of build material from the reservoir via the collection unit 117. For instance, such features may include (but are not limited to) the shape of the reservoir, the position of the suction end of the collection unit 117 relative to the shape of the reservoir, the air flow (flow rate/flow speed) generated at the suction end of the collection tube 117 during collection of build material from the bottom portion of the reservoir, the presence of the second opening (at the throughput structure 135), the position of the second opening (e.g. the positional relationship between, on the one hand, the second opening and, on the other hand, the reservoir walls and/or the collection unit), for example the asymmetrical positioning (at the side of the outlet opening) of the second opening OP2 within the reservoir, the air flow (flow rate/flow speed) through the second opening during collection of build material from the bottom portion of the reservoir, the fact that portions of the reservoir wall are capable of moving during collection of build material, the geometry of the portions of the reservoir walls that may move during collection of build material.

Figure 3B:
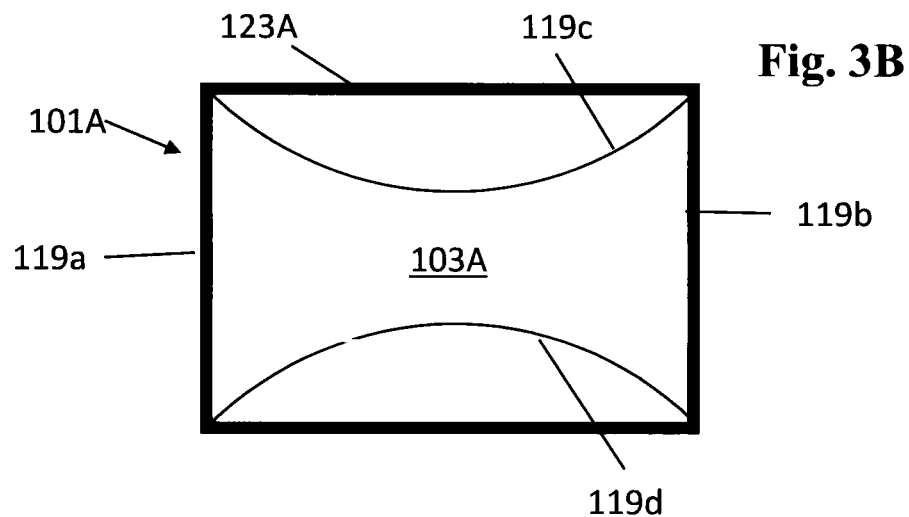
FIG. 3B illustrates a diagram of another example of a container of build material, in horizontal cross-section.
Figure 3C:
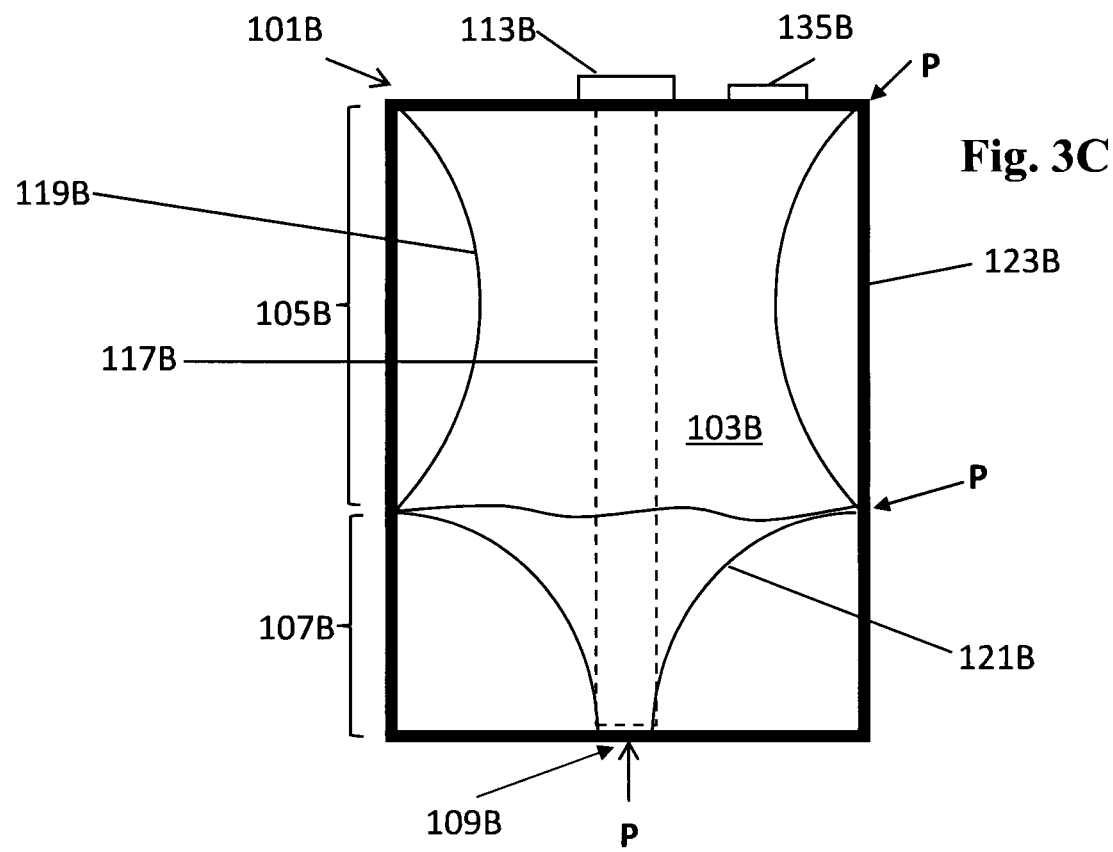
FIG. 3C illustrates a diagram of another example of a container of build material, in vertical cross-section.

In an example implementation where the reservoir 101, 101a, 101B of FIGS. 3A-3C has a volume of approximately 30 liters, a vacuum system may be connected to suck gas and build material at a rate of 20-30 litres per second, although lower flow rates may be used (e.g. 10 litres/second or more) as well as higher flow rates (30 litres/second or more). This may also be the air flow rate through the second opening OP2 (or the aggregate flow rate through plural vent openings when they are provided), and also the flow rate at the collection end of the collection tube 117, during some portions of the build-material collection process.

Structural features to promote turbulent air flow may be provided on the collection tube 117, for example using an end cap, baffles and so on as described below in relation to further example containers.

Structural features to promote turbulent air flow may be provided at the second opening OP2 (at the throughput structure 135), for example as described below in relation to FIG. 4D.

Turbulent air flow may help to make the deformation of flexible portions of the reservoir more dynamic during the collection of build material. This increase in the dynamic nature of the deformation (motion, flexing, etc.) may improve the efficiency of emptying of the container.

Figure 4A:
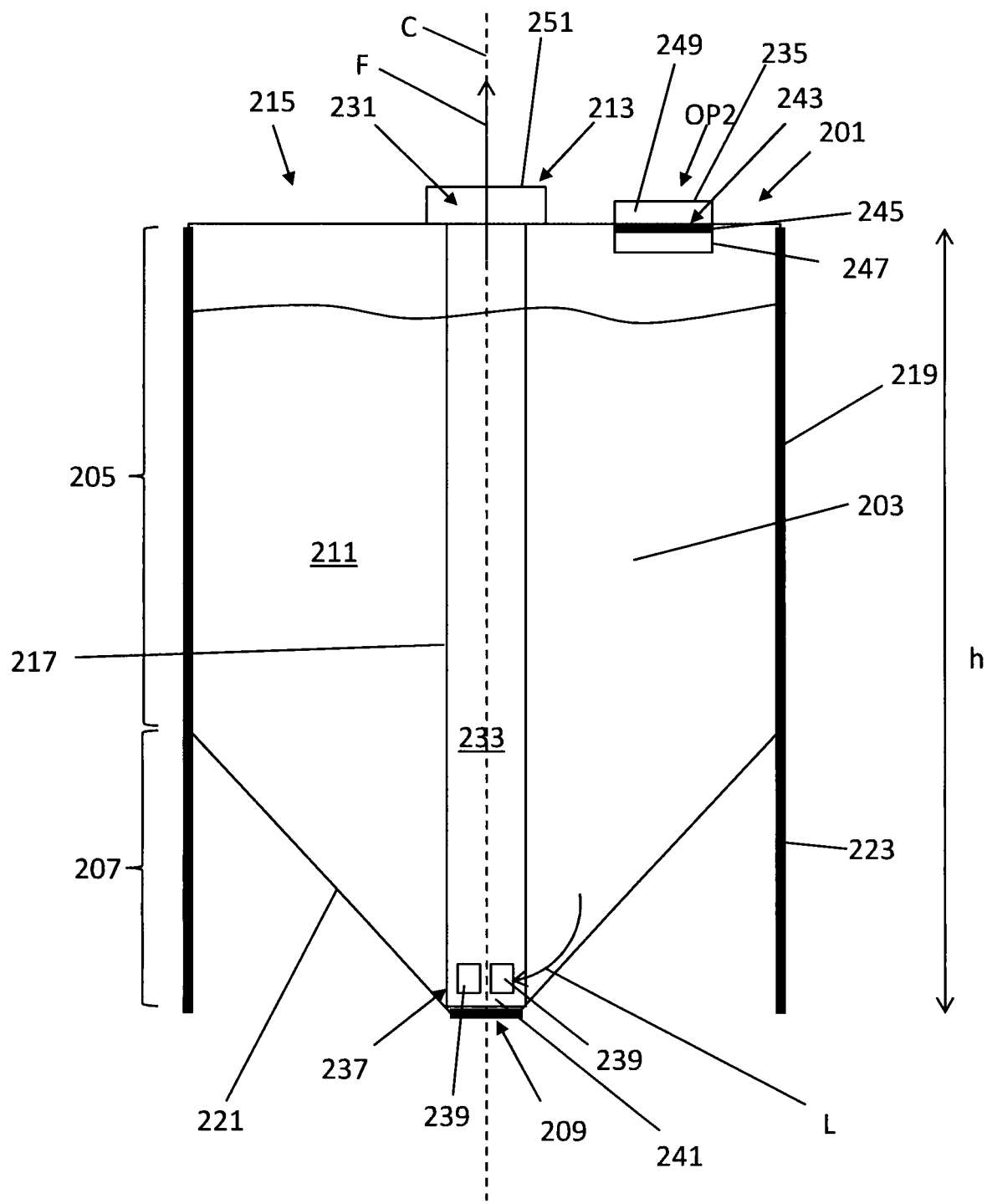
FIG. 4A illustrates a diagram of yet another example of a container of build material.

FIG. 4A illustrates another example container 201 for build material 211, including a build material reservoir 203. The reservoir 203 may be at least partly flexible. The container 201 can be provided with a reinforcement structure 223.

The container 201 has an upper portion 205 and a lower portion 207, wherein the upper portion 205 includes non-converging, for example substantially upright, walls 219 and covers most of the height h of the container 201. The container includes an outlet structure 213 having an outlet opening 231 at the top side to allow the build material 211 to exit the reservoir 203 from the top side 215. The outlet structure 213 may include an adaptor 251 to connect to an external pressure unit, such as a vacuum source, to facilitate retrieving build material from the reservoir 203 by vacuum suction.

In the illustrated example, the lower portion 207 of the reservoir is funneled to guide build material towards a center collection area at a bottom 209 of the reservoir 203 under influence of gravity and/or pressure generated by the pressure unit. The funnel is formed by inclined, converging walls 221.

The container 201 includes a longitudinal collection unit 217 that extends from the outlet opening 231 to the bottom 209 to collect build material from the bottom 209. The collection unit 217 can form a fixed or detachable part of the outlet structure 213. The collection unit 217 is to collect the build material from the collection area at the bottom 209, and to guide the build material out through the outlet opening 231 at the top 215. In one example, the collection unit 217 is at least partly tube-shaped. The tube-shaped collection unit 217 extends from the outlet opening 231 at the top 215 to the bottom 209 of the reservoir 203. The collection unit 217 extends along the non-converging, e.g. upright, upper portion 205, and into the funnel 207 to collect build material from the bottom 209 of the funnel 207. The collection unit 217 can be a rigid tube 233 or a flexible hose. In a case where the longitudinal collection unit 217 is fixed in position during collection of build material, efficient automatic collection of build material may be promoted by locating the collection end of the longitudinal collection unit 217 centrally within the cross-section of the reservoir, e.g. positioning the bottom of the collection tube 233 at the center bottom 209 of the reservoir 203.

In one example, the collection unit 217 is to facilitate vacuum suction through its tube 233. In such example, the outlet structure 213 may include an adaptor portion 251 arranged to connect to a pressure unit of an additive manufacturing apparatus so that, when the pressure unit is connected to the outlet structure 213, and switched on, a build material (and air) flow is established through the tube 233 in an upwards direction F.

In an example, the container 201 includes a throughput structure 235 in the top wall 215 next to the outlet structure 213 to facilitate venting, i.e. admission of air into the reservoir 203 during vacuum suction.

In one example the reservoir 203 has an inner volume of between approximately 5 and 60 liters and the tube 233 can have a length, between the outlet opening 231 and a distal end 241, of approximately 40 to 65 centimeters. The tube 233 can have a diameter between approximately 10 and 70 millimeters, for example between approximately 25 and 60 millimeters.

Build material is to enter the tube 233 in a distal end portion 237 of the tube. The end portion 237 extends near the bottom 209 to extract the build material from the bottom 209. In a further example the end portion 237 touches the bottom 209 whereby the tube 233 may provide additional structural reinforcement to the container 201, for example in addition to the reinforcement structure 223. The end portion 237 includes at least one suction opening 239 through which the build material is to enter. In one example, the end portion 237 includes multiple such suction openings 239 separated by wires or surfaces. In an example the end portion 237 may include a filter to inhibit transport of undesired particles into the collection system. The end portion 237 of the collection tube 233 may be shaped to cooperate with the shape at the bottom 209 of the reservoir 203, so as to facilitate positioning of the bottom end (distal end) of the collection tube within the reservoir 203, e.g. to position the distal end centrally.

In one example the end portion 237 of the tube 233 includes lateral suction openings 239 whereby in operation the build material enters the tube 233 in an at least partly lateral direction (as illustrated by arrow L). The end portion 237 may further include a distal end structure 241 such as a cap or wire. In an example the distal end structure 241 engages the reservoir bottom 209. The lateral openings 239 extend at least partially above the distal end structure 241 so that in operation build material enters into the collection tube 233 laterally, above the distal end structure 241. The distal end structure 241 may prevent that the bottom wall portions block the suction openings 239, particularly in a case where the reservoir wall is flexible and not attached to reinforcement structure. The lateral openings 239 may be arranged axi-symmetrically around the periphery of the end portion 237 of the tube 233.

As mentioned, the container 201 of FIG. 4 includes an air/build material throughput structure 235 that facilitates venting. The throughput structure 235 is provided next to the outlet structure 213, in or near a top wall 215 of the reservoir 203. In addition to venting, the throughput structure 235 is adapted to allow an operator to (i) add build material to the reservoir 203, or (ii) pour build material out of the reservoir 203. Hence, the throughput structure 235 includes an opening 243 through the reservoir to allow, in one mode, air, and in another mode, build material to pass. Having the throughput structure 235 in the top wall 215 may facilitate venting when the reservoir 203 is filled up to the top. The throughput structure 235 can be positioned between the outlet structure 213 and a lateral side wall 219 of the reservoir 203, for example at a distance from the outlet structure 213, relatively near the lateral side wall 219 of the reservoir 213. A position near the side wall 219 facilitates pouring build material directly from the reservoir 203. In one example the side wall 219 in proximity to the throughput structure 235 is attached to reinforcement structure (or otherwise inhibited from flexing/moving) so that the reservoir wall material does not move to block the opening 243 during collection of build material.

Figure 4B:
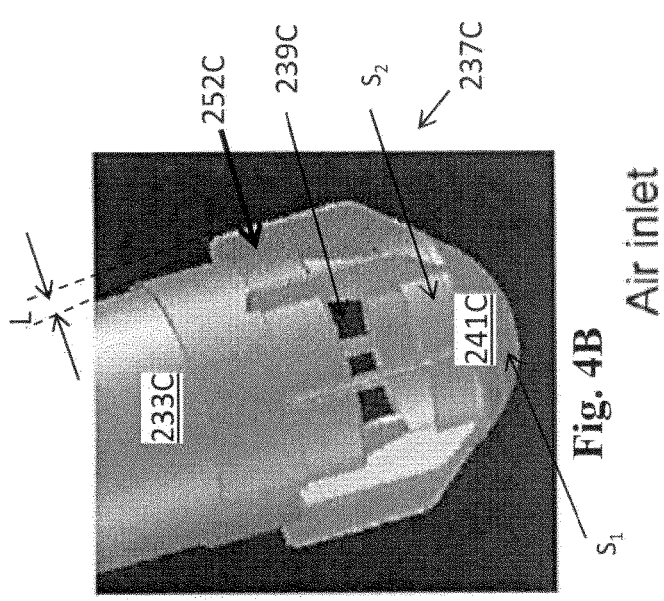
FIG. 4B illustrates a diagram of an example of an end portion of a collection tube.

The throughput structure 235 includes a filter 245 that covers the opening 243, to allow air to pass while retaining build material, in a vent mode. The throughput structure 235 includes a filter holder 247 to hold the filter 245. An example of the filter holder 247 is illustrated in FIG. 4E. The filter holder 247 has relatively rigid structures 2471 which extend across the second opening OP2. In the illustrated example there are two sets of relatively rigid structures arranged substantially parallel to each other and forming frames between which filter material may be disposed. In this example the pattern of each frame is different and the frames are made of relatively rigid plastics material. Elements of these frames may act as baffles in the gas flow path, deflecting vent gas as it is drawn into the reservoir through the filter holder. The filter holder 247 may itself contribute to causing turbulence when build material is being collected from the container and venting gas is being drawn through the second opening OP2.

The filter 245 itself may be in the form of a layer, for instance approximately 3 to 6 mm thick. Depending on the kind of build material 211 that is to be retained in the reservoir 203 the specifications of the filter 245, including the porosity and/or the thickness thereof, may be adapted so that proper filtering can be achieved. The filter 45 may have a density of at least 60 PPI (i.e., "Pore Per Inch"), at least 80 PPI, at least 100 PPI, at least 120 PPI, at least 140 PPI, or at least 160 PPI. The average pore diameter may be less than 30 microns, less than 25 microns, less than 20 microns, less than 15 microns, less than 10 microns or less than 5 microns. The filter 45 may for instance have approximately 80 PPI and an average pore diameter approximately from 25 to 30 microns The filter holder 247 with filter 245 can be decoupled from the reservoir 203, to allow build material to pass through the opening 243, for filling or pouring of build material. The reservoir 203 may include an opening with a flange and screw-threaded neck to connect and disconnect the filter holder 247. Without the filter 245, build material may exit the reservoir 203 through the opening 243 to facilitate pouring the build material out of the reservoir 203. Without the filter 245, build material may enter the reservoir 203 to fill the reservoir 203.

The outlet structure 213 and throughput structure 235 may be sealed with at least one suitable seal structure, for example a seal film that is adhered over each respective opening 231, 243. In one example, a filled container 201 is sealed with a one-time seal after it is filled with virgin build material in a filling station. In addition, a cap or lid 249 may be provided over each of the outlet structure 213 and throughput structure 235.

Certain features of the container 201 may cause, promote or contribute to turbulent air flow within the reservoir during collection of build material from the reservoir via the collection unit 217. For instance, such features may include (but are not limited to) the shape of the reservoir, the position of the suction end of the collection unit 217 relative to the shape of the reservoir, the air flow (flow rate/flow speed) generated at the suction end of the collection tube 217 during collection of build material from the bottom portion of the reservoir, the presence of the second opening OP2, the position of the second opening OP2 (e.g. the positional relationship between, on the one hand, the second opening OP2 and, on the other hand, the reservoir walls and/or the collection unit), the air flow (flow rate/flow speed) through the second opening during collection of build material from the bottom portion of the reservoir, the filter holder in the second opening OP2, the fact that portions of the reservoir wall are capable of moving during collection of build material, the geometry of the portions of the reservoir walls that may move during collection of build material.

The collection unit 217 (and other collection units used in example containers according to the present disclosure) may be provided with structural features to promote turbulent air flow in the reservoir outside the collection unit 217, for example in a collection area adjacent to the end 237 of collection tube 233. FIGS. 4C and 4D illustrate an example of an end 237C of a collection tube 233C having such structural features. FIG. 4B illustrates the structure of the tube end 237C and FIG. 4C illustrates a pattern of turbulent air flow generated using the end 237C. In the example illustrated in FIGS. 4B and 4C the tube end 237C is an end plug formed separately from the body of the collection tube 233C but mounted thereon. However, the tube end 237C may be integrated with the main body of the collection tube 233C.

Features to facilitate the turbulent air flow may include baffles provided externally of the collection tube 233C, to deflect and/or orient the air flow. In the example illustrated in FIG. 4B baffles are provided in the form of longitudinal fins 252C provided at the end 237C of the collection tube, these fins extending substantially parallel to the length direction of the collection tube 233C. Suction openings 239C are provided between adjacent fins 252C. In the example illustrated in FIG. 4B there are eight fins 252C and eight lateral suction openings 239C. The size and shape of the suction openings are not limited to those illustrated in the accompanying figures.

The width and/or length of the fins may influence, locally, the re-direction, and hence, turbulence, of the air and build material flow. For example, the fins 252C each have a portion that extends beyond the periphery of the collection tube 233C in the lateral (e.g. radial) direction. Moreover, in the direction parallel to the longitudinal axis of the collection tube 233 C each fin 252C has a short side (remote from the tube) and a longer side (connected to the collection tube).

The distance L by which the fins 252C project beyond the periphery of the collection tube 233C may affect the extent to which the fins can orient the air flow while build material is sucked in through the suction openings 239C of the collection tube 233C. If the projecting distance L is too small then the fins may not be effective to disturb the air flow to create turbulence. In an example implementation where the collection tube 233C is approximately 475 mm long, has an approximately circular cross-section with an inner diameter of approximately 40 mm, and an outer diameter of approximately 43 mm, and is provided in a reservoir 203 of an inner volume of approximately 30 litres, and each of the lateral openings 239C are approximately 14 mm high and 11 mm wide, the distance L may be set to be at least 1 mm, at least 2 mm, at least 3 mm, at least 4 mm, for example between approximately 1 and 6 mm. In the latter example implementation, the short side of the fins may be set to be 2.0 to 3.0 mm in height or 2.25 to 2.75 mm in height and the long side of the fins may be set to be 2.5 mm to 4.5 mm in height, or 3 to 4 mm in height.

Features to facilitate the turbulent air flow may include distal end structure 241C provided at the end of the collection unit 217. In the example illustrated in FIG. 4B the collection tube has distal end structure including a continuous curved portion $S_1$ disposed to face the central region of the collection end of the tube 233C; the diameter of the curved portion $S_1$ is less than the inner diameter of the tube 233C. The curved portion $S_1$ may be termed an end cap. In this example the cap has a circular periphery. A collar $S_2$ is provided at the periphery of the end cap $S_1$, extending towards the tube 233C and interconnecting the end cap $S_1$ with the fins 252C. The cap $S_1$ is convex on the side thereof facing away from the collection tube 233C and concave on the side thereof facing towards the collection tube 233C.

The end cap portion $S_1$ of the end plug 237C may allow for build material to enter the tube 233C while keeping flexible bottom walls of the reservoir from blocking the openings 239A. In an example the cap $S_1$ of the end plug 237A touches the reservoir bottom when the collection tube 233C is mounted in a reservoir and may thereby provide for additional structural reinforcement of the reservoir.

The overall configuration of the end portion 237C may facilitate turbulence near the bottom of the reservoir, outside the collection tube, in the collection area adjacent to the port where the collection tube 233C sucks in build material and air as illustrated by arrows J in FIG. 4C. However, turbulence may also be generated somewhat further away as illustrated by arrows K in FIG. 4C. For example, the transition between the non-converging walls and the converging walls may redirect air and create turbulence. For example two opposite converging walls in the funnel may be of slightly different shape than two other opposite converging walls (e.g. the bottom may be shaped like a line or a relatively thin rectangle), whereby some asymmetry exists that may aid in creating turbulence. Vibrations of flexible wall portions during vacuum suction may generate some further turbulence. Existence of turbulence within the end of the collection tube is not excluded.

Certain examples of the collection unit may have turbulence-promoting features that are disposed symmetrically. For example, the end portion 237C illustrated in FIG. 4B has fins 252C and suction openings 239C disposed at regular intervals all around the periphery of the collection tube 233C (radial symmetry, axi-symmetrical features). Such symmetrical arrangements help to promote even distribution of turbulent air flow around the reservoir, that is, they may help to ensure that turbulence affects, substantially equally, all parts of the regions in which the turbulence arises, avoiding "sheltered" regions where build material might be left relatively undisturbed (or less disturbed). Promotion of evenness in the distribution of the turbulent air flow thus tends to reduce the amount of build material that escapes collection.

Structural features to promote turbulent air flow may be provided at the second opening (at the throughput structure 135), for example as described below in relation to FIG. 4D.

Figure 4D:
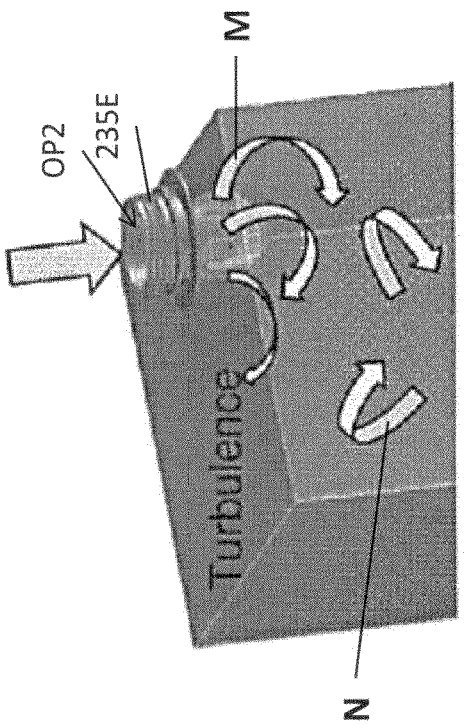
FIG. 4D illustrates a diagram of an example of a venting air inlet and associated turbulent air flow.
Figure 4C:
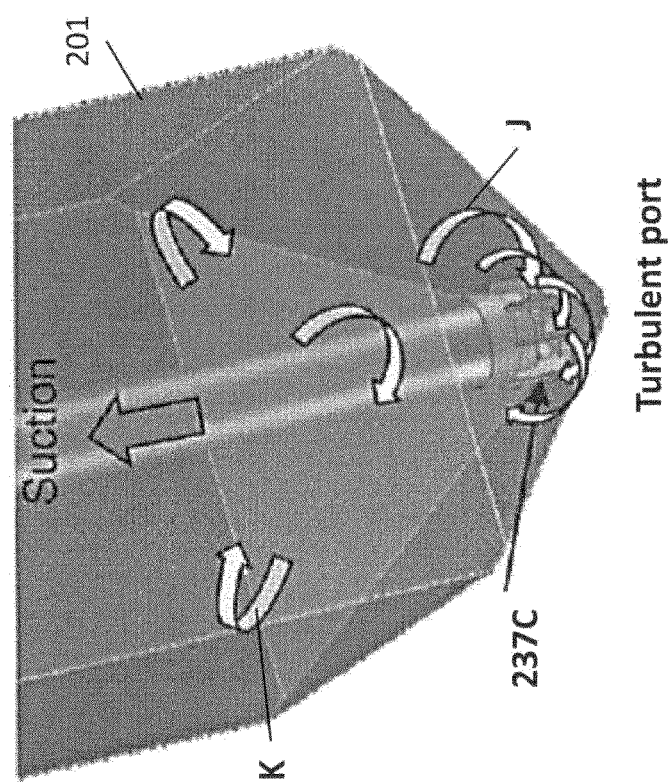
FIG. 4C illustrates turbulent air flow associated with the collection tube end portion of FIG. 4B.
Figure 4E:
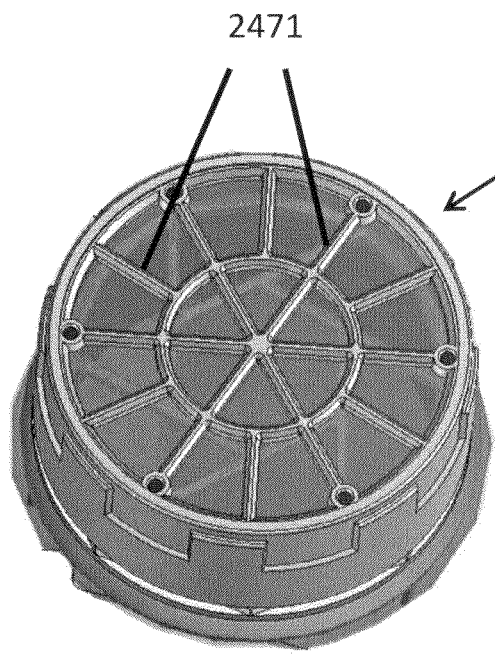
FIG. 4E illustrates an example of a filter holder.

FIG. 4D illustrates an example in which the second opening is configured as a turbulent air inlet.

The overall configuration at the second opening OP2/ throughput structure 235C may facilitate turbulence in the region adjacent to the secondary opening where venting air enters the reservoir, as illustrated by arrows M in FIG. 4D. However, turbulence may also be generated somewhat further away as illustrated by arrows N in FIG. 4D. The diameter of the second opening may be set relatively large to promote air flow and generation of turbulence: for instance, the diameter of the second opening OP2 may be set 100-200%, or 120-170%, of the inner diameter of the collection tube. Baffle structures may be provided in the throughput structure, for example using the relatively rigid structures 2471 of the filter holder 247 illustrated in FIG. 4E.

Negative pressure may arise or build up within a build material container as build material is removed from the container and/or as suction is applied with a view to collecting build material. In a case where build material is held in a reservoir that is designed to be collapsible, e.g. a flexible bag, the reservoir walls may simply wrinkle and fold under negative pressure without causing damage. However, as collection of build material progresses from a collapsible reservoir of this type, build material may become trapped in the folds of the wrinkled wall material. In some example containers according to the present disclosure a fully or partly flexible reservoir is supported by a reinforcement structure and this may inhibit wrinkling of the reservoir wall material as the container empties, and so help to avoid trapping of build material. Some containers according to the present disclosure have reservoirs with rigid walls which do not fold as the container empties, and so avoid the problem of trapping build material.

Within a build material container reservoir having rigid walls or walls that are reinforced using a reinforcement structure build-up of negative pressure may exert forces that tend undesirably to pull reservoir wall portions inwards, out of their intended position. Such forces may stress the reservoir walls and may risk causing negative effects such as wall collapse or buckling, pulling of flexible reservoir wall portions away from an associated reinforcing structure, and so on. Some example build material containers according to the present disclosure have a vent, such as the throughput structure 235, to allow ingress of air into the reservoir to help prevent undesirable effects of excess negative pressure. Build material containers such as container 201 may be termed "top-venting" containers in view of the fact that the ingress of air into the container occurs at (or near) the top of the container, at one or multiple locations. Incidentally although, for simplicity, the venting gas is referred to in this disclosure as "air", the present disclosure is not limited to the case where the venting gas that entrains the build material is air, other gases may be used: for example, the vent gas may be a gas that inhibits dust deflagration (combustible gas explosion)—for instance nitrogen, carbon dioxide, argon, or helium—or another gas or gas mixture.

Some example build material containers according to the present disclosure are "bottom-venting" containers, that is, they comprise venting structure that allows ingress of air (or other vent gas) at one or more points in the bottom portion of the reservoir, for example, in the funneled lower portion 7. "Bottom-venting" may provide an advantage even in the case of a container 201 that has a top-venting structure, because a considerable volume of build material may be interposed between the point where build material is being removed from the container (e.g. the end 237 of collection tube 233) and the throughout structure 235, especially when the container is full. Also, negative pressure may build up between a top-venting structure and a collection point at or near the bottom of the reservoir in a case where build material within the reservoir has become compacted.

Some example "bottom-venting" build material containers according to the present disclosure will now be described, with reference to FIGS. 5 to 7. Such example containers include bottom-venting structure which may help prevent damage to the container due to negative pressure within the reservoir. Further, the bottom-venting structure may of itself, or in combination with upper venting structure or other features of the container, improve the pattern of air circulation within the reservoir and thereby contribute to efficient collection of build material from the container. Thus, for example, the bottom-venting structure may of itself, or in combination with upper venting structure or other features of the container, cause, contribute to or promote turbulent air flow that facilitates efficient removal of build material from the reservoir.

Figure 5:
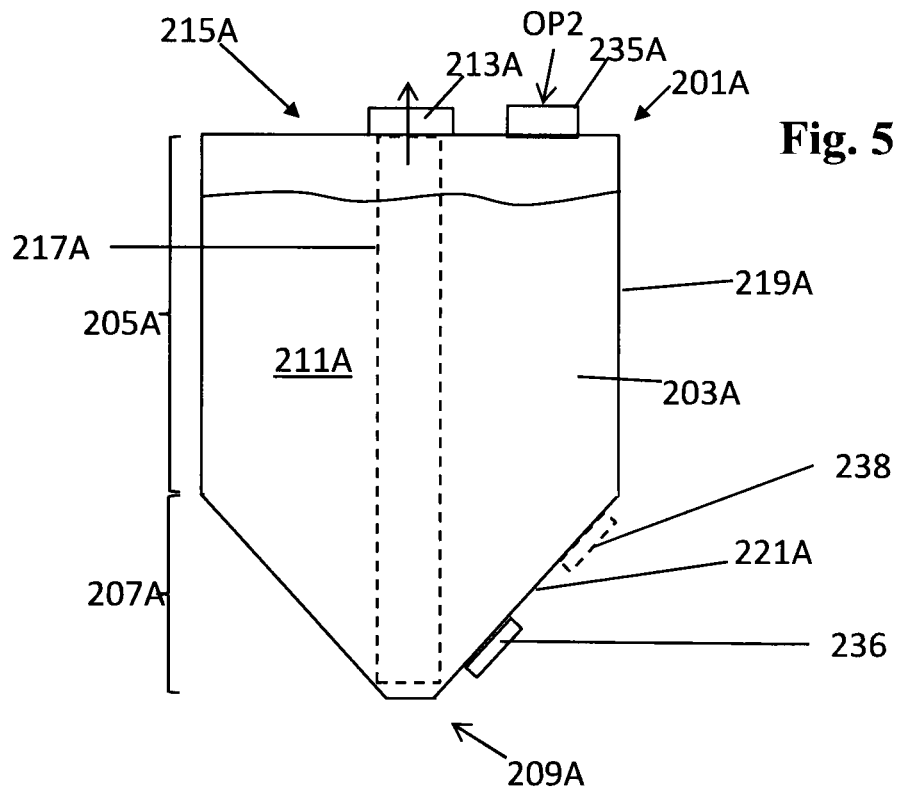
FIG. 5 illustrates a diagram of still another example of a container of build material.

FIG. 5 illustrates diagrammatically an example build material container 201A according to the present disclosure which corresponds approximately to the build material container 201 of FIG. 4 but further comprises bottom-venting structure to allow ingress of air into the lower portion 207A of the reservoir 203A. In this example the bottom-venting structure comprises a vent 236 provided in a converging side wall 221A of the lower portion 207A of the reservoir 230A. The vent 236 comprises an opening (not shown) in the converging side wall 221A and a filter (not shown) across the opening to allow ingress of vent gas into the reservoir through the opening but prevent exit of build material through the opening. The vent 236 may be provided with additional structure including but not limited to a cap or a removable seal.

The shape and/or size of the opening in the converging side wall 221A that is employed in the vent 236 may be modified, for example to adjust the degree of venting. Moreover, a set of plural vents 236 may be provided spaced apart from one another around the periphery of the reservoir. The positioning of the lower venting structure may contribute to achieving desired characteristics of air circulation within the reservoir. Thus, for example, in a case of providing a set of vents 236, a symmetrical positioning of the vents around the periphery of the reservoir may facilitate creation of an air flow pattern that promotes efficient collection of build material through a centrally-arranged longitudinal collection unit 217A.

In FIG. 5 the vent 236 (or set of vents) is positioned proximate the region where the longitudinal collection unit 217A is collecting build material from within the reservoir 203A. However instead, or in addition, one or more vents 238 (shown in dashed lines in FIG. 5) may be provided at a location in the reservoir wall that is further away than the vent 236 is from the collection region. The vent 238 may be provided with additional structure including but not limited to a cap or a removable seal.

In the case of a large-volume build material container having, for example, a reservoir of capacity 75 liters or more, use of a vent 238 positioned relatively further away from the collection region than would be the case of vent 236 may help to avoid an undesirable "bypass" condition arising (in which venting air passes directly from the vent to the collection unit 217 without entraining much or any build material) and/or occurrence of a situation in which the flow of venting air acts to oppose the motion of build material towards the entrance of the collection unit 117.

Figure 6:
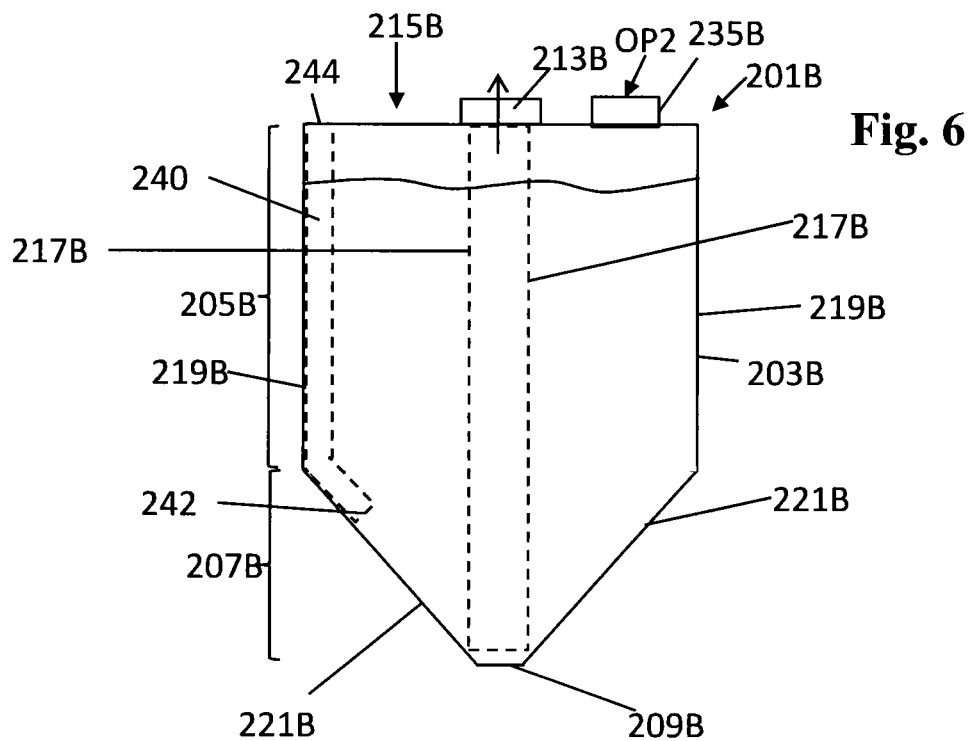
FIG. 6 illustrates a diagram of yet another example of a container of build material.

FIG. 6 illustrates diagrammatically an example build material container 201B according to the present disclosure which corresponds approximately to the build material container 201 of FIG. 4 but further includes lower venting structure comprising a vent tube 240 having, at a distal end thereof, a vent-gas delivery opening 242 that delivers vent air into the lower portion 207B of the reservoir 203B and a proximal end 244 through which vent air enters the vent tube 240 from outside the reservoir 203B.

In the example illustrated in FIG. 6, the vent tube 240 extends longitudinally from its proximal end 244 positioned at the top 215B of the reservoir 203B, along a non-converging side wall 219B of the reservoir 203B, and then has a bend so that the terminal portion of the vent tube 240 extends along a converging side wall 221B of the reservoir to reach the vent-gas delivery opening 242. At its proximal end 244 the vent tube 240 communicates with the outside of the reservoir 203B through an opening (not shown) in the top wall of the reservoir. The proximal end 244 of the vent tube may comprise connection structure that engages with cooperating connection structure in the opening to mount the vent tube 240 at the opening.

The shape and position of the vent tube 240 are not limited to the configuration illustrated in FIG. 6. Thus, for example, in a variant arrangement the proximal end 244 of the vent tube 240 may be positioned partway down the converging side wall 219B of the reservoir so that the vent tube 240 communicates with the outside of the reservoir 203B through an opening in that non-converging side wall 219B. In a variant arrangement of this kind, in a case where a reinforcing structure overlies the non-converging side wall 219B ingress of air into the vent tube during collection of build material is facilitated in the case where the proximal end of the vent tube communicates with an opening that is located in a portion of the non-converging side wall 219B that moves inward, away from the reinforcing structure, during collection of build material.

During emptying of the build material container 201B an air space may exist outside the reservoir 203B, adjacent the top wall 215B, (for example because space may be provided to accommodate the connection of a collection system to an adapter at the outlet structure 213B) and, thus, ingress of vent gas into the proximal end 244 of the vent tube 240 may be facilitated when the proximal end 244 communicates with an opening that is located in the top wall 215B of the reservoir 203B.

FIG. 6 illustrates an example in which the vent tube 240 hugs the reservoir wall. An advantage of providing the vent tube 240 so that is extends along the side wall of the reservoir is that the vent tube 240 may contribute to reinforcing the reservoir wall. Another advantage is that the side wall of the reservoir may help to stabilize the location of the vent-gas delivery opening 242 of the vent tube during collection of build material. The vent tube 240 may be formed integrally with the reservoir wall.

More than one vent tube 240 may be provided. A set of vent tubes 240 may be provided, arranged with their vent-gas delivery openings 242 spaced apart from each other around the periphery of the reservoir. The vent-gas delivery openings ends 242 of the set of vent tubes 240 may be arranged symmetrically around the periphery of the reservoir. In an example where the vent-gas delivery openings 242 of a set of vent tubes 240 are symmetrically arranged around the periphery of the reservoir this may contribute to forming a pattern of air flow within the reservoir that promotes efficient collection of build material by a centrally-arranged longitudinal collection unit 217B.

The lower venting structures in the examples illustrated in FIGS. 5 and 6 allow ingress of venting air at the periphery of the reservoir 203 while build material is collected in a region that is at the center across the width of the reservoir. Thus the air flow direction of the venting air tends to push build material towards the collection region.

The vent tube 240 may be straight rather than having a bend and, in another variant arrangement, the vent tube 240 may not hug the side wall of the reservoir; thus, for example, in a variant arrangement a vent tube 240 may extend longitudinally from a distal end that communicates with an opening (not shown) that is located part way between the outlet structure 213B and the side wall 219B of the reservoir. In such a variant the vent tube 240 may be parallel to the longitudinal collection unit 217B.

In the various examples and variants described above:
the vent tube 240 may be made of rigid material or it may be wholly or partly flexible (e.g. a hose),
a filter (not shown) may be provided across the opening that communicates with the proximal end 244 of the vent tube 240, to allow ingress of vent gas into the reservoir through the opening but prevent exit of build material through the opening (for example in the event that the container is tipped).

Figure 7:
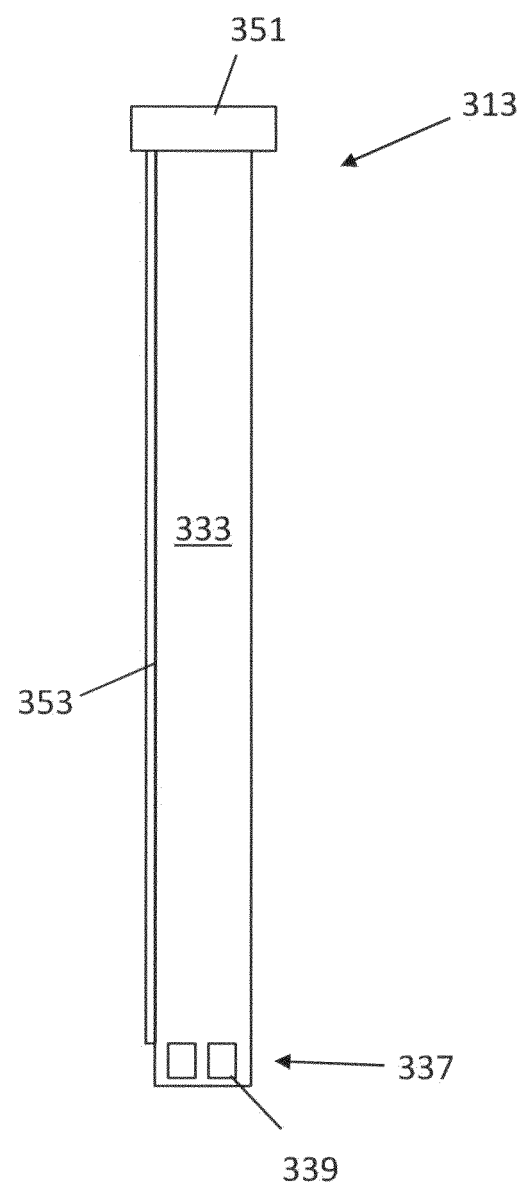
FIG. 7 illustrates a diagram of an example of a collection tube structure.

FIG. 7 illustrates an example of a build material collection tube 333. The build material collection tube 333 may include an end portion 337 at its distal end with at least one build material vacuum suction opening 339. In operation, the tube 333 may extend within a build material reservoir to collect build material from a bottom of the reservoir. In this example the tube 333 is connected to an adaptor 351 at its proximal end to connect to an associated external pressure unit. The adaptor 351 may be integral with the collection tube 333. The adaptor 351 and tube 333 may form a module which removably attaches to connection structure provided at an opening of the reservoir. This module may be considered to be an outlet structure 313 comparable to the combination of the outlet structure and collection unit of foregoing examples (e.g. the combination of 13 and 17 in FIGS. 1, 113 and 117 in FIG. 3A, and so on).

In the example illustrated in FIG. 7, the collection tube 333 further includes an air channel 353. The air channel 353 may extend along a length of the tube 333. The air channel 353 includes a proximal opening 355 that is to communicate with ambient air (or another gas) and a distal opening 357 that is to communicate with the inside of a reservoir, for example near a bottom build material collection area in the reservoir. In one example, the air channel 353 may provide for a vent connection between ambient air (or another gas) and the build material collection area at a bottom of the reservoir, in addition to another vent opening at a top side of the reservoir (e.g. see FIG. 4). Thus the air channel 353 may constitute a vent channel, so constituting a "bottom venting structure" as discussed above, and the air channel 353 may facilitate prevention of damage due to negative pressure in the reservoir. The air channel 353 may facilitate readily collecting the build material from the bottom 209, for example aiding in creating turbulence near the bottom 209.

The air channel 353 may be integral to the tube 333. In one example one or more air channels 353 extends parallel to the vacuum channel in the tube 333, next to the vacuum channel of the tube 333. Arrangements in which the air channel 353 is mounted on the collection tube 333 provide a compact arrangement for providing bottom-venting of the reservoir. Further, in such arrangements the collection tube 333 may provide reinforcement to the air channel, reducing the likelihood of damage thereof during handling or use. Arrangements which comprise plural air channels 353 disposed regularly around the periphery of the collection tube 333 may help to promote regularity in the pattern of air distribution (e.g. a regular distribution of turbulent flow) within the reservoir in the event that the collection tube 333 is mounted centrally within the reservoir (i.e. mounted to extend along the longitudinal axis of the reservoir), facilitating efficient collection of build material from the reservoir.

FIGS. 8A-8C and 9A to 9C illustrate example collection tubes 313A and 313B in which the air channel 353, and the vacuum channel in the collection tube, are nested with one another. In the examples illustrated in FIGS. 8A-8C and 9A to 9C a first tube 333A/333B defines the vacuum channel and this first tube is nested within a second tube 354A/354B. The air channel is defined between the outer wall of the first tube 333A/333B and the inner wall of the second tube 354A/354B.

In the examples illustrated in FIGS. 8A-8C and 9A to 9C, the collection tube 313A/313B includes two concentric tubular walls disposed around a center axis. The concentric arrangement of the tubular walls may help to promote a symmetrical pattern of air circulation within the reservoir in the event that the collection tube 313A/313B is mounted centrally within the reservoir (i.e. mounted to extend along the longitudinal axis of the reservoir), facilitating efficient collection of build material from the reservoir.

The collection tubes 313A/313B of the examples illustrated in FIGS. 8A-8C and 9A to 9C provide bottom-venting structure for reservoirs in example build material containers according to the present disclosure. In each case, when the collection tube 313A/B is mounted in a build material container and connected, via the adaptor 351A/B to a collection apparatus which applies suction through the inner tube of the collection tube, venting air enters the air channel between the two tubular walls through an air path 356 provided through the adaptor portion 351A/B. One structural configuration for providing air path 356 through the adaptor portion 351B is illustrated in FIG. 9C. The air path 356 may be provided through other structure at the proximal end of the collection tube 313A/B, instead of the adaptor, particularly in a case where the adaptor is provided separately from the nested tube structure 333A,354A/333B,354B (e.g. in a case where connection structure is provided at the proximal end of the nested tube structure 333A,354A/333B, 354B, to mount on cooperating connection structure on the reservoir, and it is the reservoir which comprises an adaptor for connecting to the collection apparatus).

In each of the examples illustrated in FIGS. 8A-8C and 9A-9C, the end portion 337A/B of the inner tube 333A/B is an end plug which is push-fit into the end of the inner tube 333A/B. Various forces may contribute to keep the end plug 337A/B in place in the inner tube 333A/B, for example: friction, elastic forces, suction applied to the collection tube 313A/B by a connected collection unit, and/or the end plug may be fixed in position, for instance using adhesive. Providing the end portion 337A/B as a separate end plug which is mounted to nested tube structure simplifies manufacture of the nested tube structure. However the end portion 337A/B may be formed integrally with the nested tube structure if desired.

In the examples illustrated in FIGS. 8A-8C and 9A-9C, the collection tubes 313A/B define an exit 350 for venting air, where it exits the air channel defined between the nested tubular walls and may enter the reservoir during use of the collection tube. The dimensions of the nested tubes set the position of this venting air exit 350 relative to the part of the collection tube 313A/B where build material gets collected into the inner tube (vacuum channel), i.e. relative to the build-material collection openings (suction openings) 339A/B. Arrows X indicate where venting air exits the collection tube 313A during use and arrows Y indicate where build material and air enter the vacuum channel during collection of build material by aspiration.

Figure 8A:
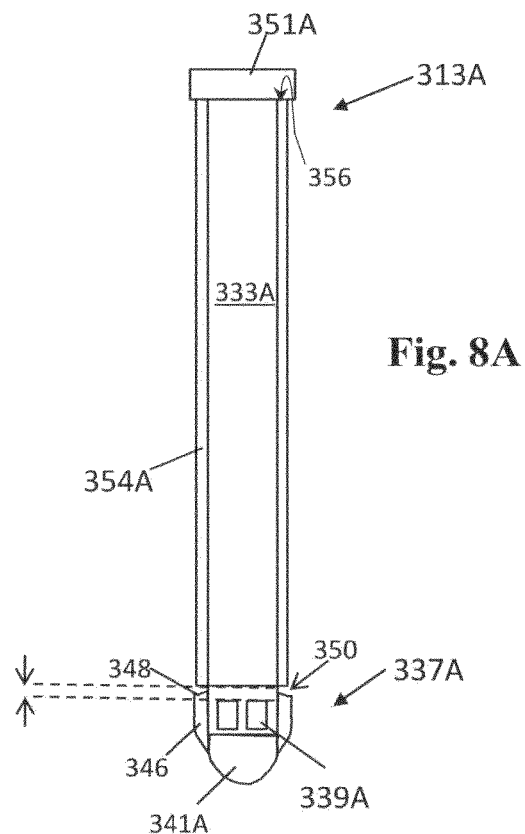
FIG. 8A illustrates a diagram of another example of a collection tube structure.
Figure 8B:
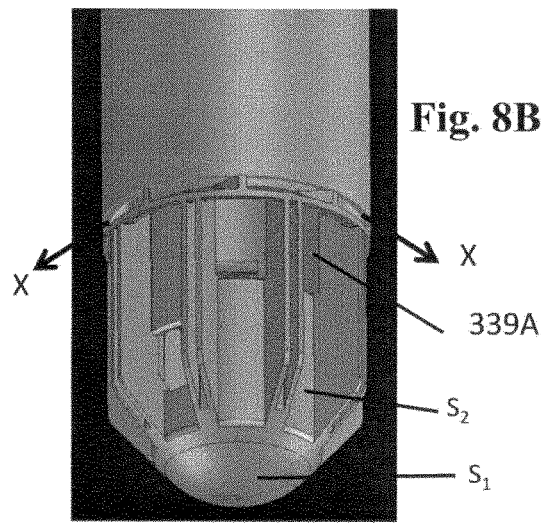
FIG. 8B illustrates, in perspective view, an end portion of the collection tube structure of FIG. 8A.
Figure 8C:
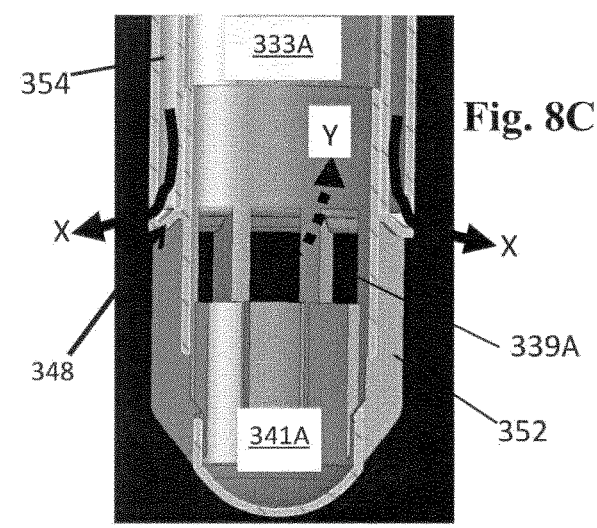
FIG. 8C illustrates, in cross-section, an end portion of the collection tube structure of FIG. 8A.

In the example collection tube 313A illustrated in FIGS. 8A-8C there is only a short distance $D_1$, in the longitudinal direction, between the venting air exit 350 where air is supplied into the reservoir and the suction openings 339A where build material is sucked into the vacuum channel (inner tube 333A). However, a deflector 348 formed at the proximal end of the end plug 337A (i.e. formed at the end where the end plug 337A is pushed into the inner tube 333A) helps to direct the venting air away from the suction openings 339A, helping to prevent an undesirable bypass condition in which venting air would pass directly from the exit 350 into the suction openings 339A entraining little or no build material (and, perhaps, even pushing build material away from the suction openings 339a). The deflector 348 may act as a baffle helping to promote generation of turbulence.

In the example illustrated in FIGS. 8A-8C, the collection tube 313A has distal end structure 341A comprising a continuous curved portion $S_1$ disposed to face the central region of the open end of the inner tube 333A; the diameter of the curved portion $S_1$ is less than the inner diameter of the inner tube 333A. The curved portion $S_1$ may be termed an end cap and, in this example, the periphery of the cap is circular. A collar $S_2$ is provided at the periphery of the end cap $S_1$, extending towards the inner tube 333A, and baffles 352 extend along the outside of the collar $S_2$, joining the end cap $S_1$ to the deflector 348.

The end cap $S_1$ of the end plug 337A may allow for build material to enter the tube 333A while keeping flexible bottom walls of the reservoir from blocking the openings 339A. In an example the end cap $S_1$ of the end plug 337A touches the reservoir bottom when the collection tube 331A is mounted in a reservoir and may thereby provide for additional structural reinforcement of the reservoir. The end cap $S_1$ is a hollow end cap with the concave surface thereof facing the end of the collection tube 333A. The end cap $S_1$ may aid in creating turbulence. The overall configuration of the end portion 337A may facilitate readily collecting build material from the bottom of a reservoir, for example aiding in creating turbulence near the bottom of the reservoir.

In this example each of the baffles 352 has a paired-fin structure as can be seen in FIG. 8B. Suction openings 339A are provided through the collar S2 between the baffles 352. In an example at least four baffles 352 and four suction openings 339A are evenly distributed around the end plug 337A. The baffles 352 may protrude laterally and, because of this, may keep flexible reservoir material from blocking the inlets 339A. The baffles 352 may contribute to creation of turbulent air flow within the reservoir. The shape and size of the baffles/fins 352 may be varied, as can the shape and size of the collection openings 339A. Further, the baffle location in the height direction of the reservoir (along the length of the collection tube) may be changed. Baffles may be provided on a tube that lacks an end cap. A baffle may be constituted using a continuous structure or cooperating discrete structural elements.

In the example collection tube 313B illustrated in FIGS. 9A-9C there is a relatively greater distance $D_2$, in the longitudinal direction, between the exit 350B where venting air leaves the outer tube 354B and the suction openings 339B where build material is sucked into the inner tube 333B. In this case the venting air exit 350B is located at a position where the outer tubular wall ends but the inner tubular wall continues in the longitudinal direction. This greater distance $D_2$ may contribute to avoiding occurrence of an undesirable bypass condition where venting air would pass directly into the suction openings 339B and/or contribute to avoiding occurrence of a condition where venting air tends to oppose entry of build material into the suction openings 339B.

In the example illustrated in FIGS. 9A-9C the end portion 337B of the collection tube 313B comprises a short tube with distal end structure 341B that includes a deflector skirt 358 and a curved wire 360 extending across the mouth of the deflector skirt 358. The mouth of the skirt 358 defines suction openings 339B at either side of the wire 360. As can be seen in FIG. 9C, the deflector skirt 358 includes an annular surface that faces the venting air exit 350B and helps to deflect venting air away from suction openings The deflector skirt 358 may act as a baffle helping to promote generation of turbulence. The central portion of the wire 360 curves away from the nested tube structure and may contact the bottom of the reservoir when the collection tube 313B is mounted in a reservoir. The configuration of the end portion 337B may facilitate readily collecting build material from the bottom of a reservoir, for example aiding in creating turbulence near the bottom of the reservoir.

The example collection tube structures of the examples of FIGS. 7 to 9 may have connector portions that mate with corresponding connector portions on outlet openings in the top wall of a build-material-container reservoir, to removably fix the collection tube structure in the reservoir.

Figure 10:
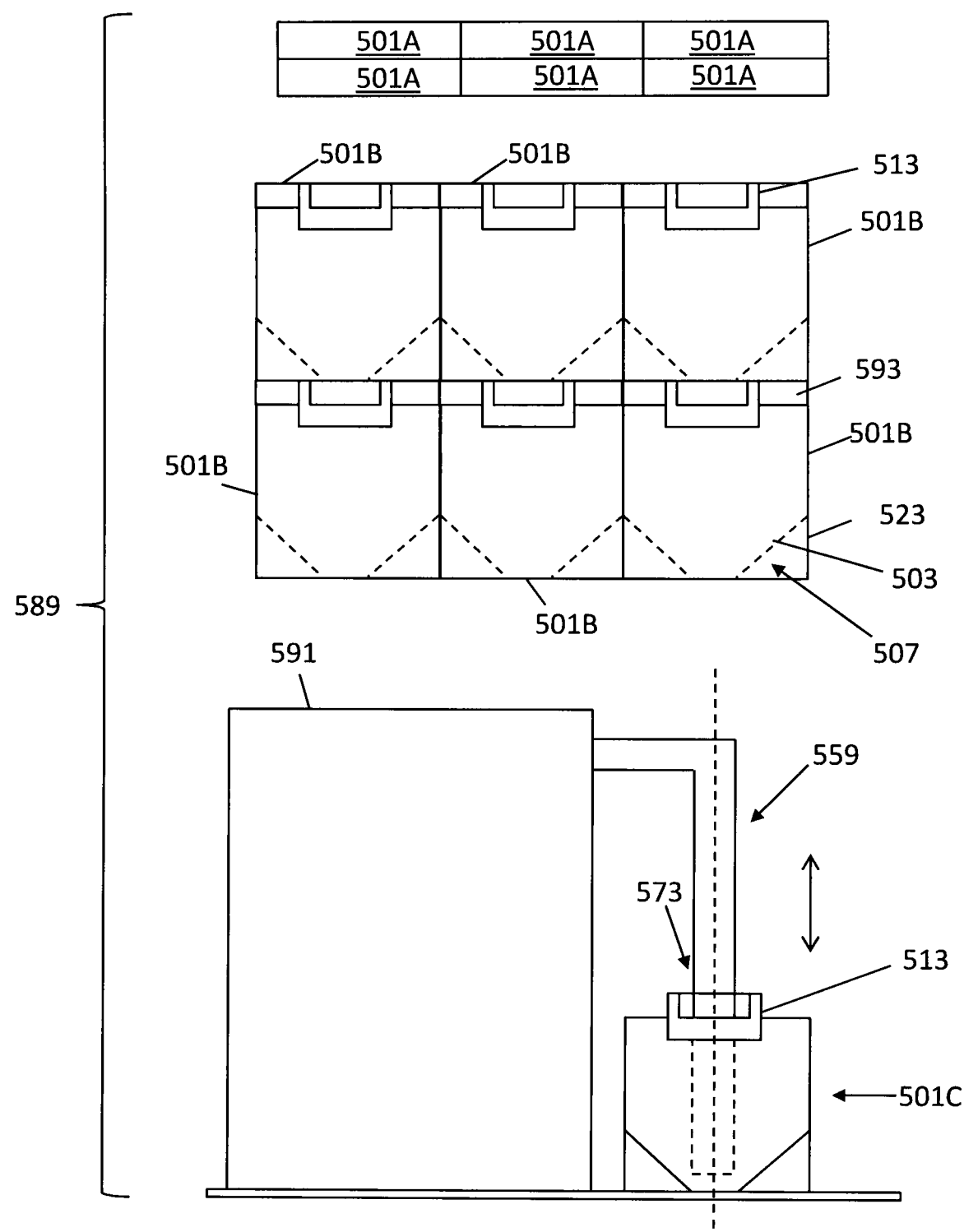
FIG. 10 illustrates a diagram of an example of an additive manufacturing system including multiple containers.

FIG. 10 illustrates an additive manufacturing system 589 including containers 501A, 501B, 501C of this disclosure. The containers 501A, 501B, 501C represent the same container in different states, during different points in a use scenario. At the top of the drawing, a batch of horizontally and vertically stacked, substantially empty containers 501A is illustrated. The containers 501A are collapsed for transport to a fill station and/or powder manufacturer. In the middle, a batch of horizontally and vertically stacked, filled, containers 501B is illustrated, for example for filled transport to, or storage before interconnection with, an additive manufacturing apparatus 591. At the bottom, the additive manufacturing apparatus 591 and interconnected container 501C are illustrated. The illustrated components of the system 589 of FIG. 10 may correspond to any of the containers and components discussed in relation to the previous figures, and hereafter.

Containers 501B of the stacked set of filled containers 501B, in the middle of FIG. 10, each include a reservoir 503 filled with build material. The containers 501B can be readily connected to an additive manufacturing apparatus 591 and replaced after usage. All containers 501B may have similar features, or at least a similar outlet structure 513, to enable them to interconnect to a single design of tube snout 573 of the additive manufacturing apparatus 591.

The additive manufacturing apparatus 591 includes a pressure unit 559 to suck build material from the container 501 through a vacuum tube snout (not shown). The pressure unit 559 includes a vacuum pump. The pressure unit 559 and container 501 may include interconnecting adaptors to facilitate interconnection of the outlet structure 513 and snout, and inhibit powder leakage before, during and after vacuum suction. The additive manufacturing apparatus 591 may further include at least one of a build material recycling system and a fusing agent dispenser. The additive manufacturing apparatus 591 may further include a build material return system to (re)fill the container 501, for example for buffering or recycling the build material. To that end, the pressure unit 459 may be include a bi-directional air pump, to facilitate both build material retrieval from, and build material filling of, the reservoir 503.

Figure 11:
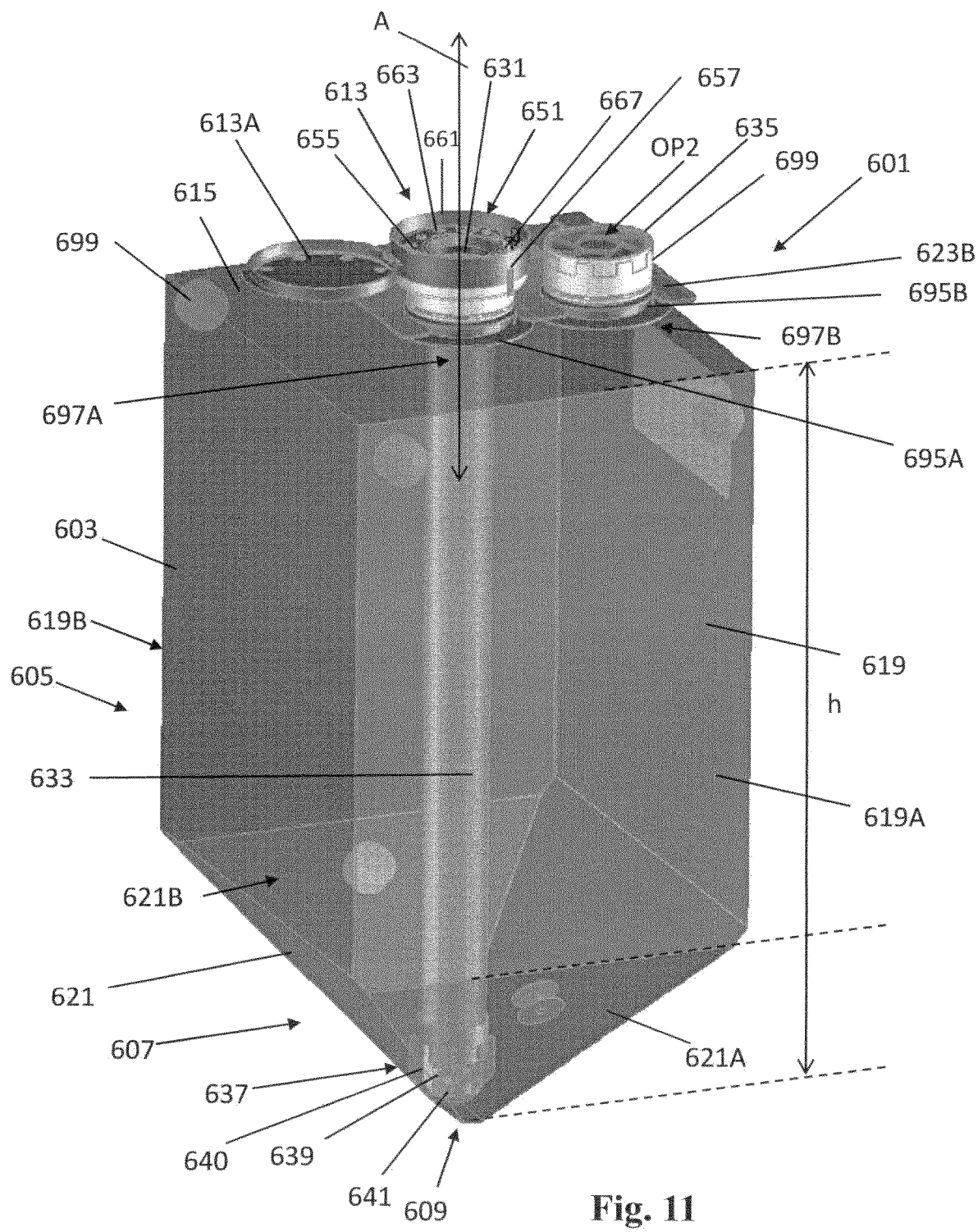
FIG. 11 illustrates a diagram of another example of a container of build material.

FIG. 11 illustrates an example of a container 601 that includes a reservoir 603. In this example, the reservoir 603 is a flexible bag. The reservoir 603 is illustrated in an expanded yet substantially non-stressed state. The reservoir 603 includes an upper portion 605 of non-converging walls 619 that extend between a top wall 615 and a lower, funneled portion 607. The upper portion 605 may be generally parallelepiped shaped. The reservoir 603 further includes the lower, funneled portion 607 of triangular shaped converging walls 621 that converge to a bottom line 609. The lower funneled portion 607 may be substantially pyramidal shaped.

The funneled portion 607 may extend over approximately 3% to 40%, or approximately 3% to 25% of a total height h of the reservoir bag, as measured from a bottom 609 to a top wall 615. In the illustration the inner volume of the reservoir 603 is approximately 10 to 60 liters, or 15 to 50 liters, although a similar structure could be suitable for smaller or larger inner volumes.

The container 601 further includes an outlet structure 613 and throughput structure 635 that are provided on the top wall 615. The container 601 includes a first opening 697A and a second opening 697B in a top wall 615. The first and second opening 697A, B extend next to each other. A relatively rigid opening connector 695A, 695B can be attached to the top wall 615, around each opening 697A, B, respectively. Each rigid opening connector 695A, 695B can include a screw threaded cylindrical neck portion for connection to a respective outlet structure 613 or throughput structure 635, and a flange portion around the screw threaded tube, wherein the flange portion may extend partially parallel to the top wall 615. The flange portion may be staked or adhered to the top wall 615 so as to prevent leakage. In an example, the first opening 697A and respective opening connector 695A extend in or near a center of the top wall 615 and the second opening 697B and respective opening connector 695B extend between said first opening 697A and a side wall, away from a center of the top wall 615.

The outlet structure 613 is connected, for example screw fitted, to the first opening connector 695A. The outlet structure 613 includes an openable and closeable lid 613A, an adaptor 651, an outlet opening 631 through the adaptor 651, and a longitudinal collection tube 633 extending from the outlet opening 631 into the funneled portion 607. FIG. 11 shows the container 601 with the lid 613A open. The adaptor 651 may facilitate a relatively easy and reliable interconnection with a snout of an additive manufacturing system. The adaptor 651 includes at least one upright, circumferential wall 657 along an outer edge 661 of the adaptor 651. The adaptor 651 includes an interface face 663 around the outlet opening 631, between the outlet opening 631 and the upright wall 657, perpendicular to the build material/air flow direction A. Several interface elements are provided in the interface face 663, for example at least one magnetic guide feature 655, a digital interface 667, a sensor engaging feature, etc.

In one example an end portion 637 of the collection tube 633 includes lateral build material inlets 639, for example between fins 640. In an example at least four fins and four inlet openings are evenly distributed around the end portion 637. The fins 640 may protrude laterally to keep flexible reservoir material from blocking the inlets 639. The end portion 637 may further include an end cap 641. The end cap 641 may also allow for build material to enter the collection tube 633 while keeping the flexible bottom walls of the reservoir 603 from blocking the openings 639. In an example the end cap 641 touches the reservoir bottom 609, in one example providing for additional structural reinforcement of the reservoir 603. The end cap and fin structure at the end portion 637 of the collection tube 633 may also cooperate with the reservoir walls to assist in assuring desired positioning of the distal end of the collection tube 633.

The throughput structure 635 is connected, for example screw fitted, to the second opening connector 695B. The throughput structure 635 may include a filter holder 647 and filter 645. The filter 645 covers the second opening 697B to allow air to pass through while retaining build material. The throughput structure 635 can be disconnected to allow build material to pass through the second opening 697B. The second opening 697B may extend closer to a side wall than the first opening 697A to facilitate manually pouring build material out of the reservoir 603. The outlet structure 613 can be closed off by the lid 613A during such pouring. The inner diameter of the filter holder 647 may define the second opening OP2 in the throughput structure 635.

The illustrated container 601 may be a flexible reservoir, for example made of PE. In a filled and sealed condition, seal films may seal the outlet structure 613 and throughput structure 631 to inhibit that too much ambient air and/or vapor contacts the powder. The seal films can be removed before usage.

In an empty condition, the reservoir 603 may be collapsed. The build material collection tube 633, outlet structure 613 and throughput structure 635 can be disconnected from the container 601 to facilitate collapsing.

In a further example, a reinforcement structure can be attached to the reservoir 603, to support the reservoir 603. In an example, the reinforcement structure extends adjacent all of the walls 619, 621 of the reservoir 603. The reinforcement structure can be attached (e.g. using adhesive, plastic rivets 699, and so on) to various wall portions of the reservoir.

In one example, two opposite non-converging side walls 619A, 619B of the upper portion 605 of the reservoir 603 are each attached to the reinforcement structure by plastic rivets 699 at two locations, and this allows the walls 619A, 619B to flex with respect to the reinforcement structure. The other two non-converging side walls 619 are adhered to the reinforcement structure over substantially all of their surface area and so are inhibited from flexing. Also, each of two opposite converging side walls 621A, 621B of the bottom portion 607 are attached to the reinforcement structure by a single plastic rivet which allows these converging side walls 621A, 621B to flex (move, vibrate). The other two converging side walls 621 are adhered to the reinforcement structure over substantially all of their surface area and so are inhibited from flexing. Also other wall portions, for example of the top wall 615, can be reinforced.

In one implementation of the example of FIG. 11, the upper portion 605 is approximately parallelepiped shaped, has a rectangular cross-section roughly 300 mm by 270 mm and extends over a height of approximately 300 mm, whereas the lower section 607 extends over a height of approximately 200 mm and is generally pyramidal with the apex truncated to form a region that is approximately line shaped (approx. shape of a narrow rectangle about 25 mm wide).

In one example the opening connectors 695A, 695B are reinforced using a second reinforcement structure 623B. In FIG. 11 the second reinforcement structure is illustrated as a planar element but it may take another form, for example, it may form part of a box in which the container and reinforcement structure are housed.

A reservoir portion of the container of this disclosure may have a generally parallelepiped shape over most of its height and an upside-down pyramidal shape near the bottom. The cubical portion has substantially non-converging, e.g. approximately upright, walls. The parallelepiped and pyramidal shapes have rectangular cross sections, which may facilitate efficient storage and transport, as compared to, for example, curved cross sections such as cylinder or coned shapes.

The converging bottom allows for most of the build material to drop towards a collection area at the bottom by gravity. The non-converging upper portion facilitates storing relatively large volumes of build material within the contours of the container. The non-converging upper portion and converging lower portion can be part of a single, monolithic, bag-like reservoir.

In one example the reservoir is at least partly flexible. Portions of the flexible walls of the reservoir may flex and/or vibrate when positive or negative pressure is applied, thereby assisting in flow of the build material towards the collection area. In certain scenarios some of the build material may release itself from certain pockets or corners formed in the flexible walls by vibration or flexing of the walls. Thereby most or all of the build material can be retrieved from the reservoir.

In certain examples, a lower portion of the reservoir does not need to have a funneled shape. For example, the side walls of the reservoir may be upright from top to bottom. For example the side walls may be substantially rectangular. Such container may efficiently store build material within the contours of the container, for example more efficiently than a container with a partly funneled reservoir. A disadvantage can be that it may be more difficult, as compared to funneled reservoirs, to extract all or most of the build material from the bottom. Certain measures may be provided to counter such potential disadvantage, for example the collection tube in the container can be made flexible, or adapted in such a manner, to be able to reach build material near edges of a bottom of the reservoir. In another example, the bottom can be made flexible to vibrate or flex under vacuum pressure, in such a manner that the build material drops or moves toward a bottom collection area, for example as illustrated in FIG. 3. Again referring to FIG. 3, a longitudinal collection tube 117 may engage the bottom at the center whereby the bottom around the center may lift under vacuum pressure and the collection tube 117 then retains the center bottom, and whereby the build material may move towards the inlet of the suction openings of the outlet tube.

In one example, the container is suitable for transport, additive manufacturing apparatus interconnection, build material retrieval, replacement, and disposal. In one example, for disposal purposes, the reinforcement structure includes cardboard or other bio-degradable material. Other bio-degradable material can include other cellulose fiber based material. The flexible reservoir can be made of a relatively degradable plastics, such as certain polyethylene films. In another example the flexible reservoir can include at least one bio-degradable layer such as coated, compressed cellulose based materials. Special coatings may provide for an air/vapor barrier.

In one example the reservoir can be partly relatively flexible and partly reinforced, for example by having varying materials and/or wall thicknesses. In such example the reinforcement structure can be integral to the reservoir, rather than separate and attached to the reservoir. The reservoir can have flexible and rigid wall portions. For example the reservoir includes, integrally, (i) flexible reservoir walls or flexible portions of reservoir walls and (ii) reinforced reservoir walls or portions of reservoir walls. Such reservoir could have fold lines along reinforced wall portions to facilitate folding reinforced wall portions.

In one example, a container of this disclosure can be an assembly of separate parts. To that end, a kit of separate parts can be provided, to form a container of this disclosure. The kit may include a reservoir, a reinforcement structure, an outlet structure and a throughput structure. The reservoir may have precut openings to connect the outlet structure and throughput structure. Separate sub-components of the outlet structure may include an adaptor, a longitudinal tube structure, and a tube end portion with lateral holes. Also, screws and adhesive may be provided. In addition an additional outer structure carrying a graphics design of the container may be provided. Separate seal films may cover the outlet structure and throughput structure until opened for usage of the container.

In one example a pressure unit of an additive manufacturing apparatus, to be connected to a container of this disclosure, has an air speed of at least 10 liters per seconds or at least 15 liters per second, for example 20 to 30 liters per second. In one example, the flexible reservoir wall material is to flex or vibrate when air circulates into the container though the throughput opening and out of the container through the outlet opening, The containers of this disclosure may be arranged to provide build material to additive manufacturing apparatuses for additive manufacturing. In certain examples the additive manufacturing apparatus is directly connectable to the container to collect the powder from the container and add it to the additive manufacturing process. The additive manufacturing apparatus can be a recycler and/or a 3D printer that includes a pressure unit. In another example, separate, specialized build material pressure unit can be used to transport build material from the container to the additive manufacturing apparatus.

The container may be to store approximately 5-60 liters of build material, for example approximately 10-50 liters or approximately 15-40 liters. These volumes and associated weights, that depend on the type of build material, may allow for an operator to readily handle the container, for example to manually lift, stack and move the container, for transport, storage and additive manufacturing. In addition the container can be readily connected to an additive manufacturing apparatus by an easy, quick and relatively clean interconnection action, for collecting the build material. The container can be replaced by a new container 1 when empty, allowing for easy disposal or collapsing in a substantially empty condition. During most of the process steps escaping build material powder may be inhibited.

In build material containers according to the present disclosure, the outlet structure, throughput structure and collection unit may be electrically conductive to help avoid build-up of static electricity, helping to avoid explosion or dust deflagration. The electrical conductivity may be achieved in various ways, for instance, parts may be made of plastics material containing carbon black and/or carbon fiber to ensure conductivity.

The following non-exhaustive list recites certain features that may be provided—singly or in any desired combination—in build material containers according to the present disclosure. These features may improve emptying of build material from containers. These features may cause, contribute to or promote turbulent air flow, for example turbulent air flow in a volume enclosed by the reservoir and outside the collection unit:

having a second opening, to allow ingress of venting air, at the top portion of the reservoir (in addition to the build material outlet opening), achieving a value of air flow, through the secondary (top venting) opening, sufficiently high that the turbulent air flow is caused or promoted, having a relationship between the value of air flow through the secondary (top venting) opening relative to the value of air flow through a set of one or more suction openings of the collection unit that causes, contributes to or promotes the turbulent air flow, setting the size of the secondary (top venting) opening in a range that causes, contribute to or promotes the turbulent air flow, having a positional relationship, between the secondary (top venting) opening and a set of one or more suction openings of the collection tube, that causes, contributes to or promotes the turbulent air flow, having, in the container, bottom-venting structure that permits ingress of venting gas into the lower portion of the reservoir, e.g. through one or more openings), achieving a value of venting air flow, through the bottom-venting structure, sufficiently high that the turbulent air flow is caused or promoted, having a relationship between, on the one hand, the value of venting air flow through the bottom-venting structure and, on the other hand, the value of air flow through a set of one or more suction openings of the collection unit and/or through a secondary (top venting) opening, that causes, contributes to or promotes the turbulent air flow, setting the size of a set of one or more openings of the bottom-venting structure in a range that causes, contributes to or promotes the turbulent air flow, having a positional relationship, between the bottom-venting structure and a set of one or more suction openings of the collection tube, that causes, contributes to or promotes the turbulent air flow, setting the cross-sectional area of a set of one or more suction openings of the collection unit in a range that causes, contributes to or promotes the turbulent air flow, having a positional relationship, between the set of one or more suction openings of the collection unit and the walls defining the reservoir, that causes, contributes to or promotes the turbulent air flow, providing, at the top vent opening and/or at the bottom-venting structure and/or on the collection unit (e.g. at the set of one or more suction openings, or elsewhere), a set of one or more structural elements that promote turbulence, the structural elements including but not limited to baffles, deflectors, and tube end-caps, having reservoir walls defining an internal space, of the reservoir, that is shaped to cause, promote or contribute to the turbulent air flow and/or which particularly benefits from turbulent air flow to improve build-material collection from corners or the like in said internal space (e.g. having a parallelepiped shaped top portion and funneled lower portion), having reservoir walls comprising portions that remain static and portions that may move (flex, vibrate), with a geometry of the static and moveable portions that enables movement of the moveable portions that causes, contributes to or promotes turbulent air flow, having reservoir walls comprising portions that remain static and portions that may move (flex, vibrate), with a positional relationship between, on the one hand the static and moveable portions of the reservoir walls and, on the other hand, the set of one or more suction openings of the collection tube and/or the secondary (top venting) opening and/or bottom-venting structure, that causes, contributes to or promotes turbulent air flow.

An example additive-manufacturing build-material container according to the present disclosure comprises a reservoir to hold build material, an outlet opening in a top portion of the reservoir, an outlet tube structure including a longitudinal collection tube to suck up build material at one end thereof, from a bottom region of the reservoir, upon application of a suction force at the other end thereof, and to guide the collected build material to the outlet opening at the top; and a vent opening in a top portion of the reservoir to admit gas from outside the reservoir into the reservoir to follow a gas flow path through the vent opening, through the reservoir and into said one end of the longitudinal collection tube; and on the gas flow path there is at least one turbulent-gas-flow-generation feature to generate turbulent gas flow in a region that is within the reservoir and outside the longitudinal collection tube.

Various features may be provided in the latter container to promote generation of turbulent flow in a region that is at least within the reservoir and outside the collection tube, including, inter alia: a baffle extending in the air flow path and restraining or deflecting the flow (for instance a the tube end nozzle with fins, filter holding structure, and so on); positioning the vent opening next to the build material outlet thereby making the arrangement asymmetric; providing flexible reservoir wall portions to vibrate (flex, move) during build material collection; and arranging a hollow cap under the suction end of the collection tube.

Tests on certain example build material containers according to the present disclosure have shown that build material can be removed almost entirely from the containers under automatic collection by suction, leaving only 1% of build material remaining.

Although the build material container according to the present disclosure has been described above with reference to certain examples, it is to be understood that various modifications and adaptations may be made to the examples. Specifically, the various examples of adaptors, outlet structures, throughput structures, bottom-venting structure, reservoirs, reinforcement structures, and collection tubes, as well as the components thereof (filters, filter holders, baffles, fins, end caps, lateral openings, deflectors, and so on), may be used in different combinations and sub-combinations than those explicitly described above.

An example additive-manufacturing build-material container according to the present disclosure comprises a reservoir to hold build material, an outlet opening in a top portion of the reservoir, an outlet tube structure including a longitudinal collection tube to suck up build material at one end thereof through inlet openings, from a bottom region of the reservoir, upon application of a suction force at the other end thereof, and to guide the collected build material to the outlet opening at the top; and a vent opening in a top portion of the reservoir to admit gas from outside the reservoir into the reservoir; wherein said one end of the longitudinal collection tube include baffles next to its inlet openings.

In the latter container, the vent opening may extend through a top wall next to the outlet opening. A build material filter holder may be provided in the vent opening. Part of the side walls of the reservoir may vibrate under the influence of air/build material flow and part of the side walls may remain in place under the influence of air/build material flow. A cap may be provided disposed facing one end of the collection tube. The reservoir may include an upper portion of more than half the height of the reservoir, having relatively non-converging side walls, and a lower funnel portion between the upper portion and the bottom, having converging side walls, at least in a filled sate, and the longitudinal collection tube may extend from the top of the reservoir into the funnel portion.

Furthermore, although reference has been made above to promoting the even distribution of turbulent air flow within the reservoir by arranging turbulence-promoting structural features regularly, or symmetrically, on collection tubes, it will be understood that evenness in the distribution of turbulent air flow may likewise be promoted via symmetrical or regular arrangement of other turbulence-promoting geometric and structural features in build material containers according to the present disclosure. However, certain asymmetries, for example the asymmetric arrangement produced by positioning a second (vent) opening to one side of a central outlet opening, may promote the generation of turbulence.

Moreover, although the outlet opening and second opening are both provided in the top surface of the reservoir in various example containers described herein, the outlet opening and/or second opening may be provided in side walls at the top portion of the reservoir.

Furthermore, although certain examples of end portions of collection tube have been described herein, in which a generally dome-shaped hollow cap is provided facing the open end of the collection tube, with the cap having the concave surface thereof facing the collection tube and a convex surface facing away from the collection tube, it is to be understood that caps of different shapes may be employed (e.g. a cap shaped like a truncated cone).

The invention claimed is:

1. An additive-manufacturing build-material container comprising:
a reservoir to hold build material;
an outlet opening in a top portion of the reservoir,
an outlet tube structure including a longitudinal collection tube to suck up the build material at one end thereof, from a bottom region of the reservoir, upon application of a suction force at the other end thereof, and to guide the build material to the outlet opening at the top portion;
a vent opening in the top portion of the reservoir to admit gas from outside the reservoir into the reservoir to follow a gas flow path through the vent opening, through the reservoir and into said one end of the longitudinal collection tube; and
a baffle in said gas flow path to generate turbulent gas flow in a region that is within the reservoir and outside the longitudinal collection tube; and
wherein portions of the reservoir are arranged to flex upon said gas flow.

2. The container of claim 1, wherein relatively rigid structures extend across the vent opening.

3. The container of claim 1, wherein the vent opening is of approximately the same diameter or of a larger diameter than the diameter of the outlet opening to admit gas from outside the reservoir at a sufficiently high gas flow rate to enable said turbulent gas flow in the reservoir.

4. The container of claim 1, wherein the outlet opening extends through the center of the top portion of the reservoir, and the vent opening extends through said top wall next to, but spaced from, the outlet opening.

5. The container of claim 1, wherein other portions of the reservoir are inhibited from flexing during said gas flow.

6. An additive-manufacturing build-material container comprising:
a reservoir to hold build material;
an outlet opening in a top portion of the reservoir,
an outlet tube structure including a longitudinal collection tube to suck up the build material at one end thereof, from a bottom region of the reservoir, upon application of a suction force at the other end thereof, and to guide the build material to the outlet opening at the top portion, said one end of the longitudinal collection tube having laterally protruding fins;
a vent opening in the top portion of the reservoir to admit gas from outside the reservoir into the reservoir to follow a gas flow path through the vent opening, through the reservoir and into said one end of the longitudinal collection tube; and
a turbulent suction port formed at said one end of the longitudinal collection tube to generate turbulent gas flow in a region that is within the reservoir and outside the longitudinal collection tube.

7. An additive-manufacturing build-material container comprising:
a reservoir to hold build material;
an outlet opening in a top portion of the reservoir,
an outlet tube structure including a longitudinal collection tube to suck up the build material at one end thereof having lateral openings, from a bottom region of the reservoir, upon application of a suction force at the other end thereof, and to guide the collected build material to the outlet opening at the top portion, said one end of the longitudinal collection tube having a cap under the lateral openings, the cap adjacent to, or touching upon, a bottom wall of the reservoir; and
a vent opening in the top portion of the reservoir to admit gas from outside the reservoir into the reservoir to follow a gas flow path through the vent opening, through the reservoir and into said one end of the longitudinal collection tube.

8. The container of claim 7, wherein said one end of the longitudinal collection tube has laterally protruding fins between said lateral openings.

9. An additive-manufacturing build-material container comprising:
a reservoir to hold build material;
an outlet opening in a top portion of the reservoir,
an outlet tube structure including a longitudinal collection tube to suck up the build material at one end thereof, from a bottom region of the reservoir, upon application of a suction force at the other end thereof, and to guide the build material to the outlet opening at the top portion;
a vent opening in the top portion of the reservoir to admit gas from outside the reservoir into the reservoir to follow a gas flow path through the vent opening, through the reservoir and into said one end of the longitudinal collection tube;
a lower vent opening to admit gas from outside the reservoir into a lower portion of the reservoir; and
a baffle in said gas flow path to generate turbulent gas flow in a region that is within the reservoir and outside the longitudinal collection tube.

10. The container of claim 9, wherein the lower vent opening is an opening at the end of a vent tube.

11. The container of claim 9 wherein the outlet tube structure includes, nested one in the other, said longitudinal collection tube and said vent tube having a lower vent opening to admit gas from outside the reservoir into the lower portion of the reservoir.

12. An additive-manufacturing build-material container comprising:
a reservoir to hold build material;
an outlet opening in a top portion of the reservoir,
an outlet tube structure including a longitudinal collection tube to suck up the build material at one end thereof through inlet openings, from a bottom region of the reservoir, upon application of a suction force at the other end thereof, and to guide the build material to the outlet opening at the top portion; and
a vent opening in a top portion of the reservoir to admit gas from outside the reservoir into the reservoir;

wherein said one end of the longitudinal collection tube include baffles next to the inlet openings and part of the side walls of the reservoir are to vibrate under the influence of air/build material flow and part of the side walls are to remain in place under the influence of air/build material flow.

13. The container of claim 12, wherein the vent opening extends through a top wall, next to the outlet opening.

14. The container of claim 12, wherein a build material filter holder is provided in the vent opening.

15. The container of claim 12, and comprising a cap disposed facing said one end of the collection tube.

16. The container of claim 12, wherein the reservoir includes:
 an upper portion of more than half the height of the reservoir, having relatively non-converging side walls, and
 a lower funnel portion between the upper portion and the bottom, having converging side walls, at least in a filled state; and
 the longitudinal collection tube extends from the top of the reservoir into the funnel portion.

* * * * *